(12) United States Patent
Manevich et al.

(10) Patent No.: US 11,741,083 B2
(45) Date of Patent: Aug. 29, 2023

(54) CROSS-SHARD PRIVATE ATOMIC COMMIT

(71) Applicant: International Business Machines Corporation, Armonk, NY (US)

(72) Inventors: Yacov Manevich, Haifa (IL); Hagar Meir, Tel Aviv (IL); Artem Barger, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 16/937,638

(22) Filed: Jul. 24, 2020

(65) Prior Publication Data
US 2022/0027348 A1 Jan. 27, 2022

(51) Int. Cl.
G06F 16/00 (2019.01)
G06F 16/23 (2019.01)
G06F 9/52 (2006.01)
H04L 9/06 (2006.01)
H04L 9/00 (2022.01)

(52) U.S. Cl.
CPC .......... *G06F 16/2379* (2019.01); *G06F 9/52* (2013.01); *H04L 9/0637* (2013.01); *H04L 9/0643* (2013.01); *H04L 9/50* (2022.05)

(58) Field of Classification Search
None
See application file for complete search history.

(56) References Cited

U.S. PATENT DOCUMENTS 10,866,865 B1 * 12/2020 Morkel ............... G06F 16/2379
2018/0145836 A1 * 5/2018 Saur ................... G06Q 20/3829
2018/0357019 A1 * 12/2018 Karr .................... G06F 11/2005
2019/0097790 A1 * 3/2019 Li ............................... H04L 9/12
2019/0180373 A1 6/2019 Creighton et al.
2019/0182313 A1 6/2019 Yoo et al.

(Continued)

FOREIGN PATENT DOCUMENTS

| CN | 108881274 B | 10/2019 |
| WO | 2019207504 A1 | 10/2019 |
| WO | 202022957 A1 | 1/2020 |

OTHER PUBLICATIONS

"HotStuff: BFT Consensus in the Lens of Blockchain", by Maofan Yin, D. Malkhi, M. Reiter, Guy Golan Gueta, Ittai Abraham less Published Mar. 13, 2018 Computer Science, arXiv: Distributed, Parallel, and Cluster Computing. (Year: 2018).*

(Continued)

*Primary Examiner* — Hasanul Mobin
(74) *Attorney, Agent, or Firm* — Mark Bergner

(57) ABSTRACT

A computer-implemented system and method process a private transaction for dividing a blockchain transaction into a plurality of requests. Each of the requests have transaction data and a same transaction identifier. Each request is sent to a respective participating shard of a set of participating shards in the blockchain transaction of the blockchain. A response to the request is received from each participating shard, and each of the responses is sent to at least the participating shards except the shard the response was received from. In an atomic commit operation, a prepare transaction is created comprising information from the responses and the transaction identifier. The prepare transaction is submitted to the blockchain, and validity answers are received from the shards.

18 Claims, 25 Drawing Sheets

(56) References Cited

U.S. PATENT DOCUMENTS

| | | | |
|---|---|---|---|
| 2019/0377648 A1* | 12/2019 | Abraham | G06F 11/2023 |
| 2020/0026548 A1 | 1/2020 | Huang | |
| 2020/0026699 A1* | 1/2020 | Zhang | H04L 9/0643 |
| 2020/0042635 A1 | 2/2020 | Douglass et al. | |
| 2021/0026745 A1* | 1/2021 | Wang | H04L 63/1416 |
| 2021/0099294 A1* | 4/2021 | Guo | G06Q 20/38215 |
| 2021/0344500 A1* | 11/2021 | Vaughan | H04L 9/14 |
| 2021/0399898 A1* | 12/2021 | Wright | H04L 9/3033 |
| 2021/0406872 A1* | 12/2021 | Thai | G06Q 20/065 |

OTHER PUBLICATIONS

Wang et al., "SoK: Sharding on Blockchain," AFT '19, Oct. 2019, 21 pgs, https://eprint.iacr.org/2019/1178.pdf.

Mell, P., Grance Timothy, "The NIST Definition of Cloud Computing", Special Publication 800-145, Recommendations of the National Institute of Standards and Technology, US Department of Commerce, 7 pages (Sep. 2011).

Atomic Commit—Wikipedia, May 27, 2020, 2 pgs, https://en.wikipedia.org/wiki/Atomic_commit.pdf.

Two Phase Commit Protocol—Wikipedia, May 27, 2020, 3 pgs, https://en.wikipedia.org/wiki/Two-phase_commit_protocol.pdf.

* cited by examiner

CROSS-SHARD PRIVATE ATOMIC COMMIT

BACKGROUND

Disclosed herein is a system and related method for utilizing a cross-shard private atomic commit in a digital ledger application.

In order to permit blockchain protocols to scale efficiently, various techniques for sharding may be employed. However, sharding also introduced a further level of complexity when processing transactions. It is important to preserve the integrity of a blockchain transaction ledger while at the same time protecting the privacy of parties involved in the transaction.

SUMMARY

According to one aspect disclosed herein, a computer-implemented method is provided to process a private transaction for dividing a blockchain transaction into a plurality of requests. Each of the requests have transaction data and a same transaction identifier. Each request is sent to a respective participating shard of a set of participating shards in the blockchain transaction of the blockchain. A response to the request is received from each participating shard, and each of the responses is sent to at least the participating shards except the shard the response was received from. In an atomic commit operation, a prepare transaction is created comprising information from the responses and the transaction identifier. The prepare transaction is submitted to the blockchain, and validity answers are received from the shards.

According to another aspect disclosed herein, a system is provided to process a private transaction. A client processor divides a blockchain transaction into a plurality of requests, each of the requests having transaction data and a same transaction identifier. The processor sends each request to a respective participating shard of a set of participating shards in the blockchain transaction of the blockchain. The processor receives, from each participating shard, a response to the request, and sends each of the responses to at least the participating shards except the shard the response was received from. In an atomic commit operation, the processor creates a prepare transaction comprising information from the responses and the transaction identifier. The processor then submits, to the blockchain, the prepare transaction. The processor receives validity answers from the shards. Each shard processor is configured to receive a request related to a blockchain transaction from a client, the request comprising transaction data and a transaction identifier. The shard processor sends a response to the request to the client, and receives, from the client, a peer response created by other peer shards participating in a the blockchain transaction. The shard processor then commits the prepare transaction.

According to another aspect disclosed herein, a computer program product comprises instructions for a processor to receive a request related to a blockchain transaction from a client, the request comprising transaction data and a transaction identifier. The instructions cause the processor to send a response to the request to the client, and receive, from the client, a peer response created by other peer shards participating in a the blockchain transaction. The instructions cause the processor, in an atomic commit operation, to commit the prepare transaction.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview of the Cross Shard Private Atomic Commit System

Transaction processing for recording a blockchain transaction into a ledger may involved sharding of the transaction in order to improve efficiency. However, such sharding introduces a level of complexity into the blockchain protocol.

Disclosed herein is a system which may utilize a cross-shard private atomic commit. According to this privacy model, the blockchain is divided into a plurality of private shards that all share the same ledger. The transactions may span multiple shards, and the parties that do not participate in a transaction cannot know which shards are involved. In this model, clients may fail or be malicious. Shards do not leak data, but they may fail or become unavailable. Each shard has a secret symmetric key chosen uniformly and at random, and is known only to the peers of the shard. Although a non-participating (in a transaction) shard may be aware of the transaction being handled by other shards and its identifier, it knows nothing else about the transaction. The shards participating in a transaction are aware of information from other peer shards and may utilized that information in the validation and commit process.

Figure 1A:
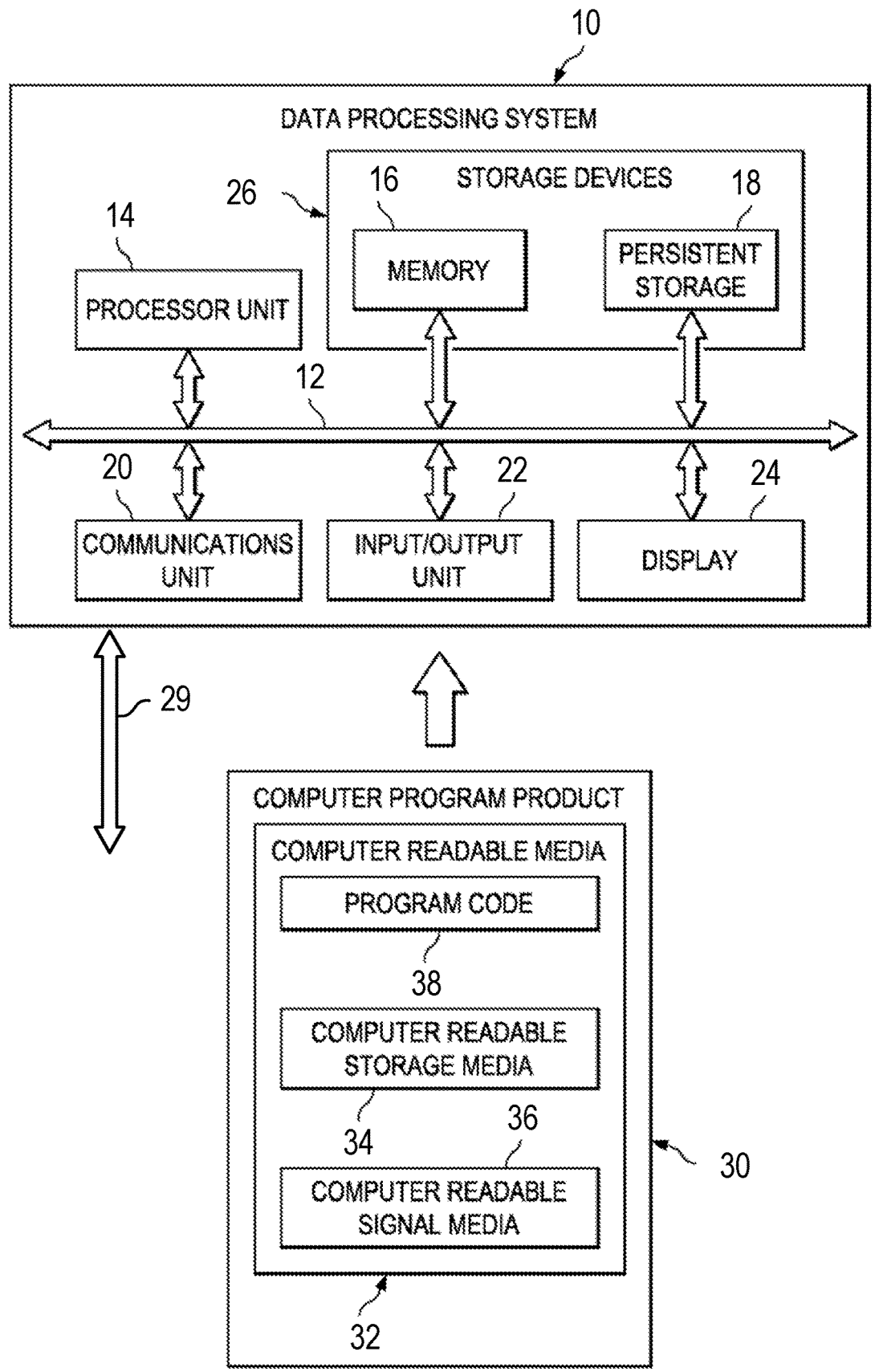
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
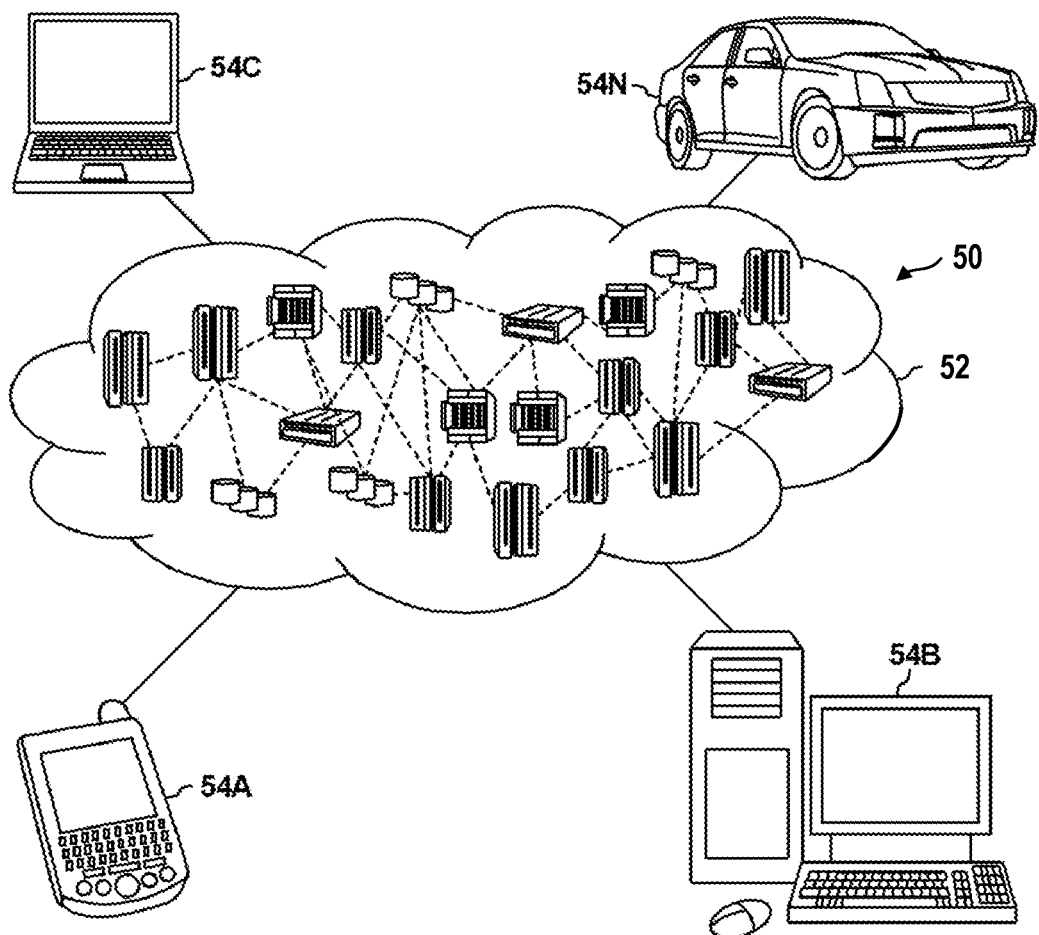
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
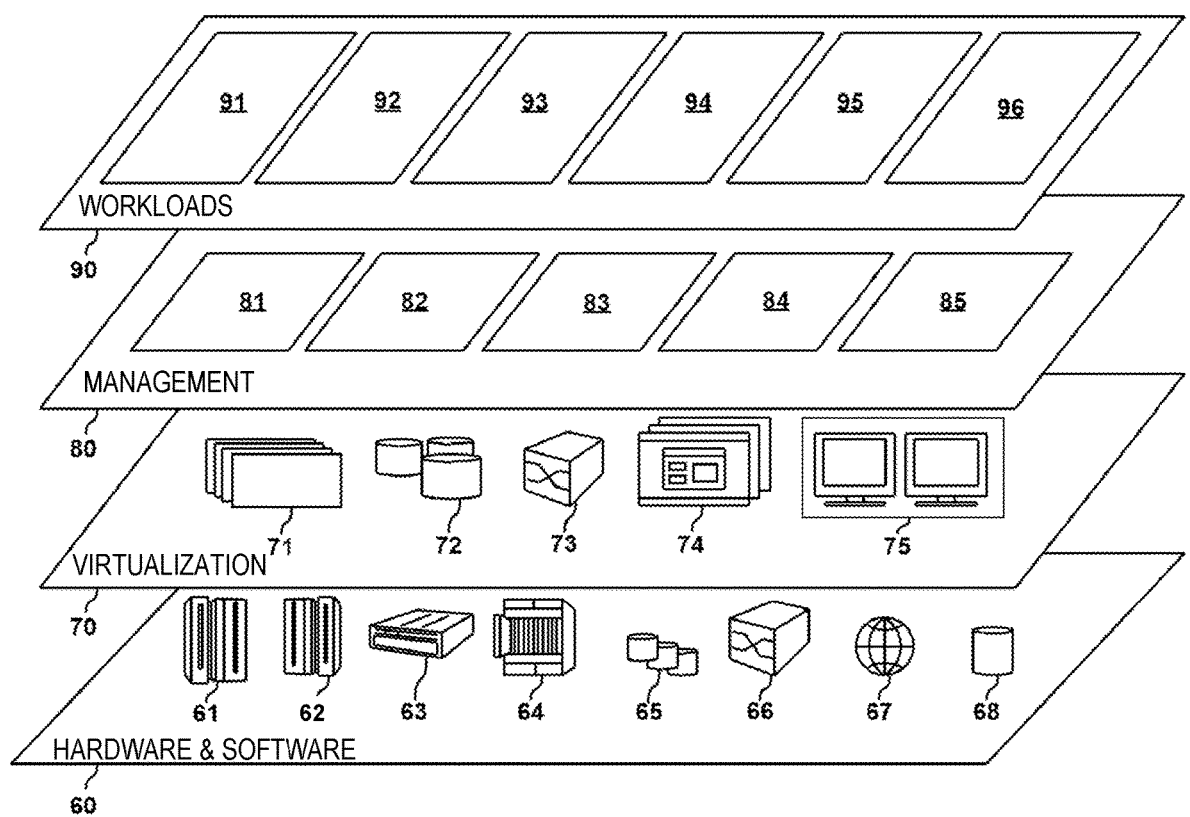
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

Blockchain Basic Detail

The instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in example embodiments, the application is not limited to a certain type of connection, message, and signaling.

Example embodiments provide methods, systems, components, non-transitory computer readable media, devices, and/or networks, which provide for a cross-shard private atomic commit in blockchain networks.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for a cross-shard private atomic commit in blockchain networks in blockchain networks. The example embodiments solve the issues of time and trust by extending features of a database such as immutability, digital signatures and being a single source of truth. The example embodiments provide a solution for a cross-shard private atomic commit in blockchain networks in blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for a cross-shard private atomic commit in blockchain networks in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient method for a cross-shard private atomic commit in blockchain networks in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for a cross-shard private atomic commit in blockchain networks.

One of the benefits of the example embodiments is that it improves the functionality of a computing system by implementing a method for a cross-shard private atomic commit in blockchain-based systems. Through the blockchain system described herein, a computing system can perform functionality for a cross-shard private atomic commit in blockchain networks in blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a Business Network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed method for a cross-shard private atomic commit in blockchain networks cannot be implemented in the traditional database.

Meanwhile, if a traditional database were to be used to implement the example embodiments, the example embodiments would have suffered from unnecessary drawbacks such as search capability, lack of security and slow speed of transactions. Additionally, the automated method for a cross-shard private atomic commit in a blockchain network would simply not be possible.

Accordingly, the example embodiments provide for a specific solution to a problem in the arts/field of cross-shard private atomic committing.

The example embodiments also change how data may be stored within a block structure of the blockchain. For example, a digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

According to the example embodiments, a system and method for a cross-shard private atomic commit in blockchain networks are provided. A blockchain document processor may have two components:
  a private off-chain processor that manages secure processing of private information related to a participant; and
  a ledger processor that manages processing of common information shared with all participants of a blockchain network using the consensus algorithm of the network.

According to the example embodiments, each of the organizations that intend to share documents with other organizations uses a blockchain document processor connected to a blockchain network. Using the document processor, the organizations may set up the following on the ledger:
  a list of document templates;
  attributes of each document template that will be shared in hashed form on the ledger;
  a combination of key attributes from different templates for matching and sharing documents; and
  partnership Merkel trees: each partnership Merkel tree may be built based on partnering organizations' identifiers (IDs).

All documents (files, JSONs) are stored on the off-chain data store. Only the attribute hashes and the document identifier (ID) are submitted as a part of a blockchain transaction.

According to one example embodiment, a document identifier and a document type may be linked to hashed attributes for sharing. Hashed owner's organization id may include composite keys such that:
  given the document ID, a document processor may get all hashed attributes for sharing; and
  given a hashed attribute for sharing, the document processor may get all document IDs and their hashed owner organization id.

When a document is recorded and given its hashed attributes for sharing, the document processor may get all the documents and their hashed owner organization IDs. The processor may check if incoming document owner organization ID and each owner organization IDs are part of a partnership Merkel tree. If the IDs belong to the partnership Merkel tree for the subset of documents within an eligible organization relationship, the processor may get the required templates for logic matching. Based on evaluating the hashed attribute matching, the processor may get the list of documents (and their owners) to which the incoming document needs to be linked. Then, the processor may create the linked documents. The processor may generate a one-time pass code so that the participants can link to this document and pass it through all participants. The participants may then query the blockchain with the one-time pass code and hashed organization ID to retrieve the incoming document key. Using the document key, the participant may retrieve the shared document from the owning party (i.e., a blockchain node) and store the document on the recipient's off-chain storage.

Figure 2A:
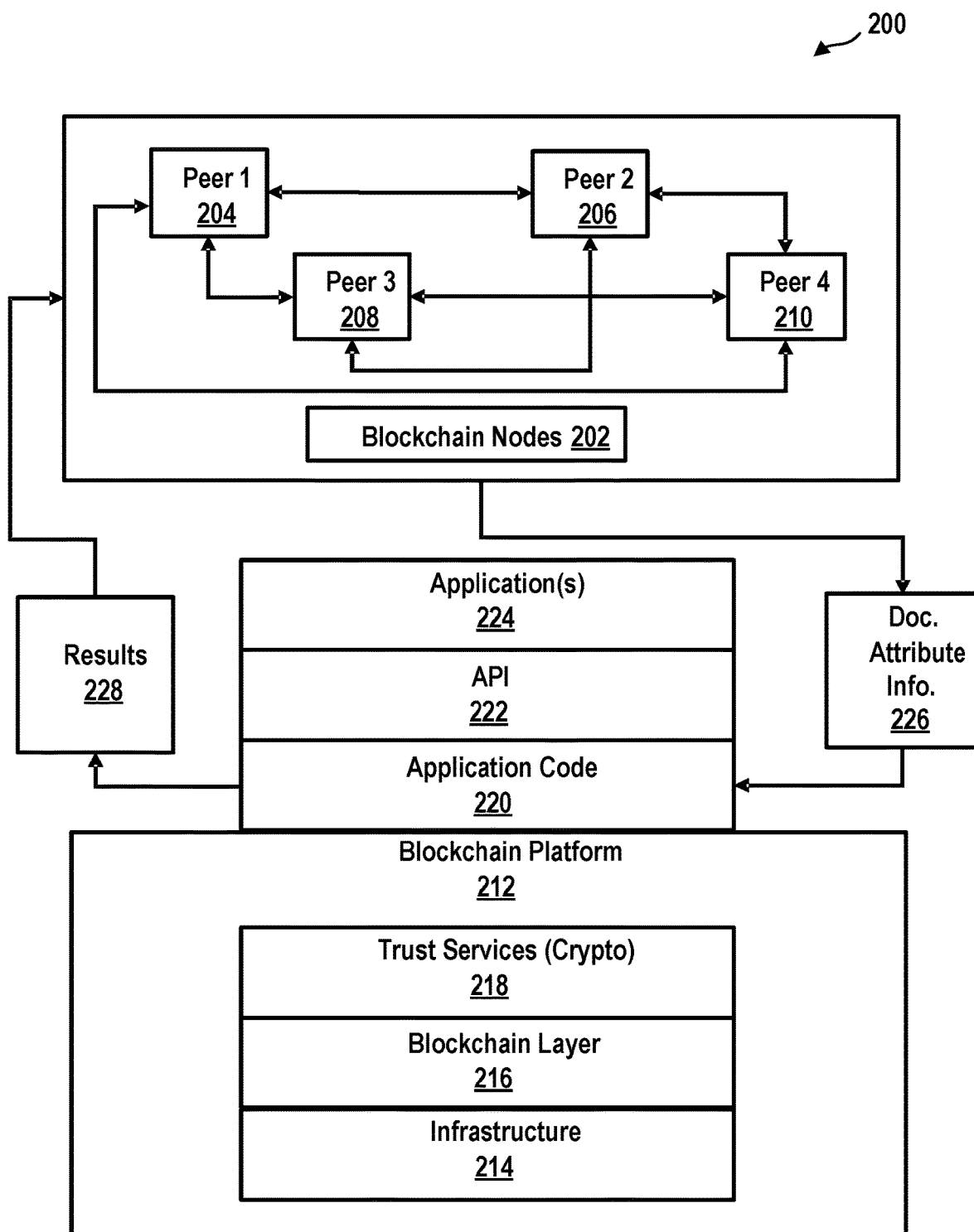
FIG. 2A is a block diagram that illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
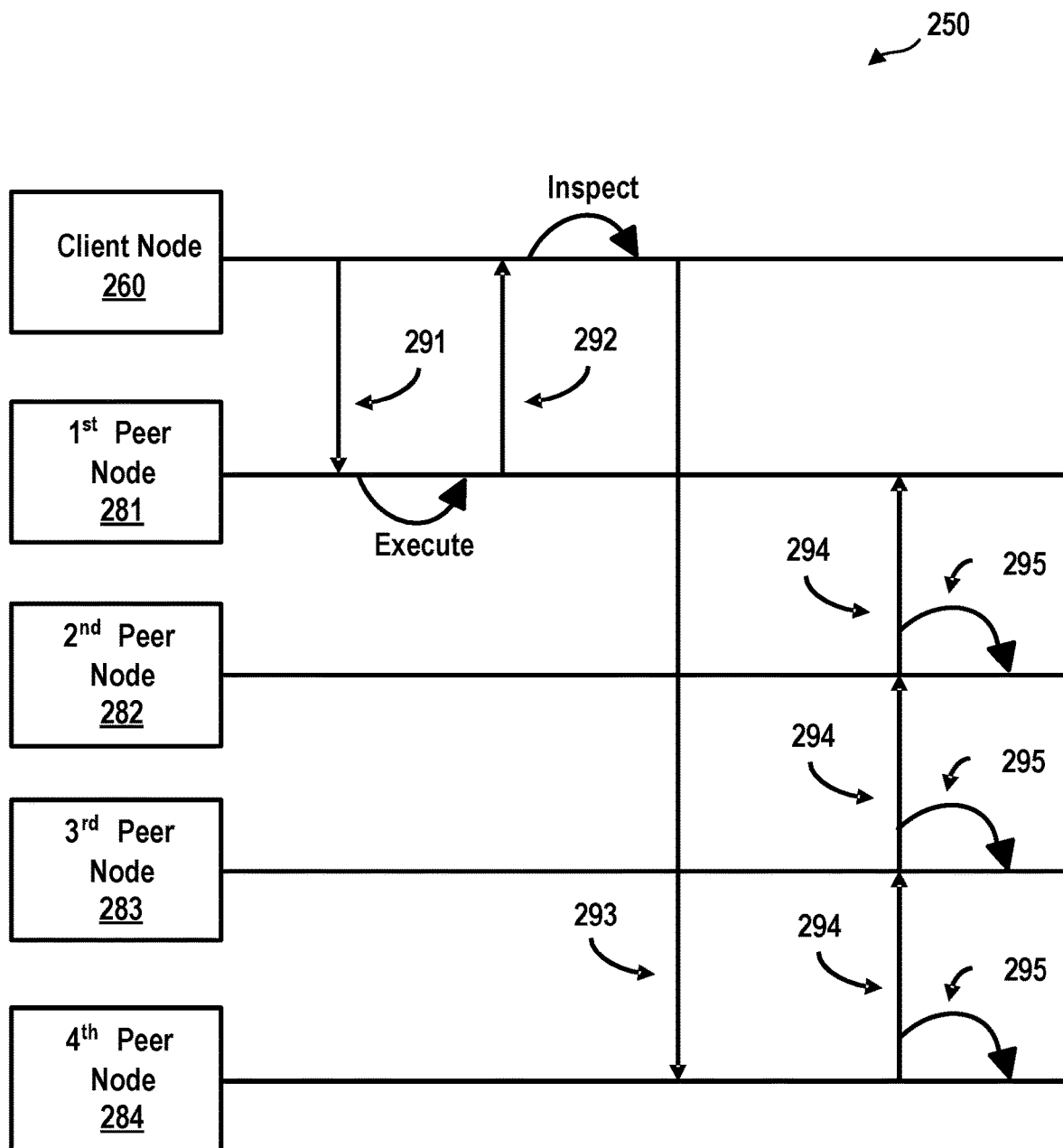
FIG. 2B is a flow diagram that illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
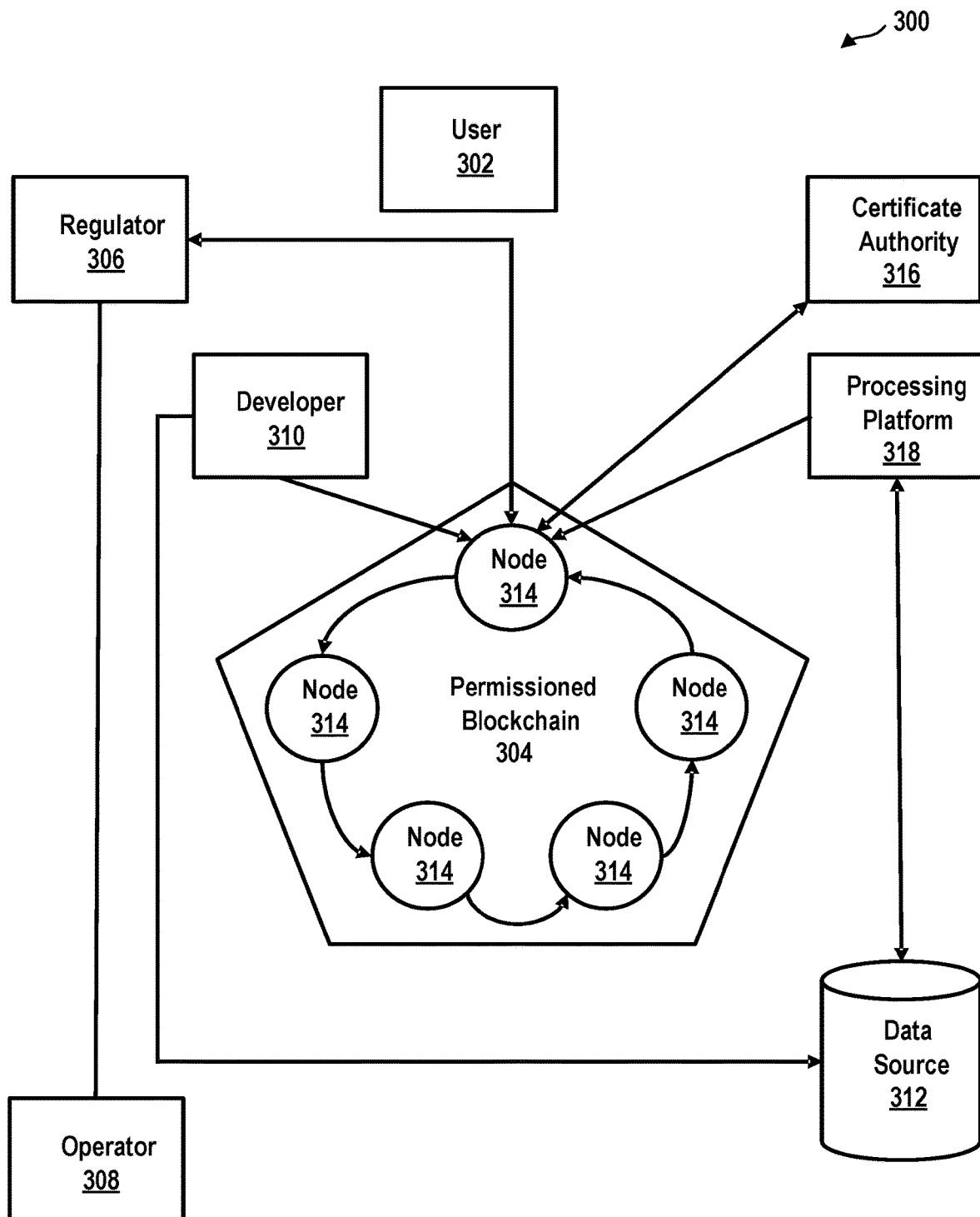
FIG. 3A is a block diagram that illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
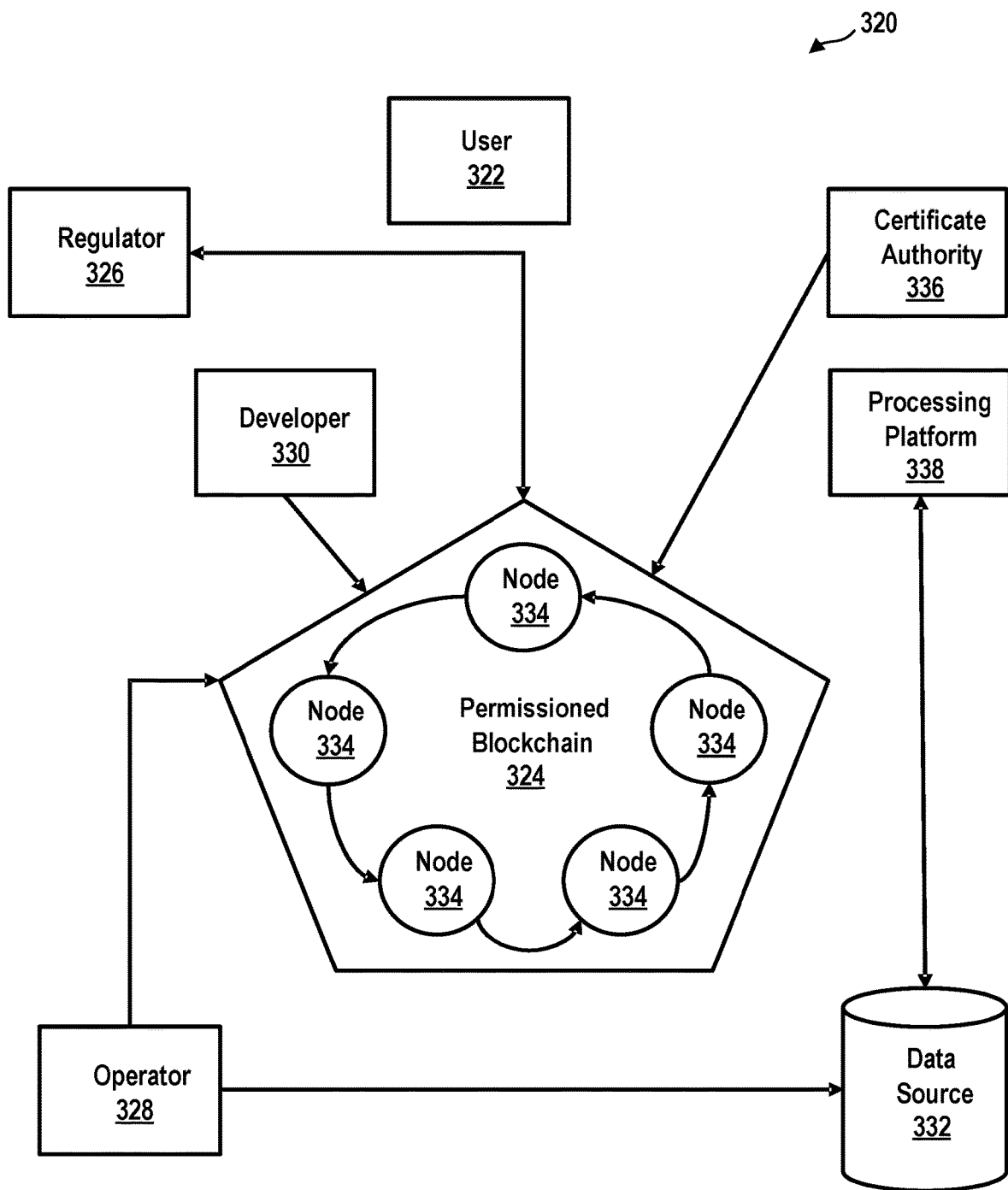
FIG. 3B is a block diagram that illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332.

To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
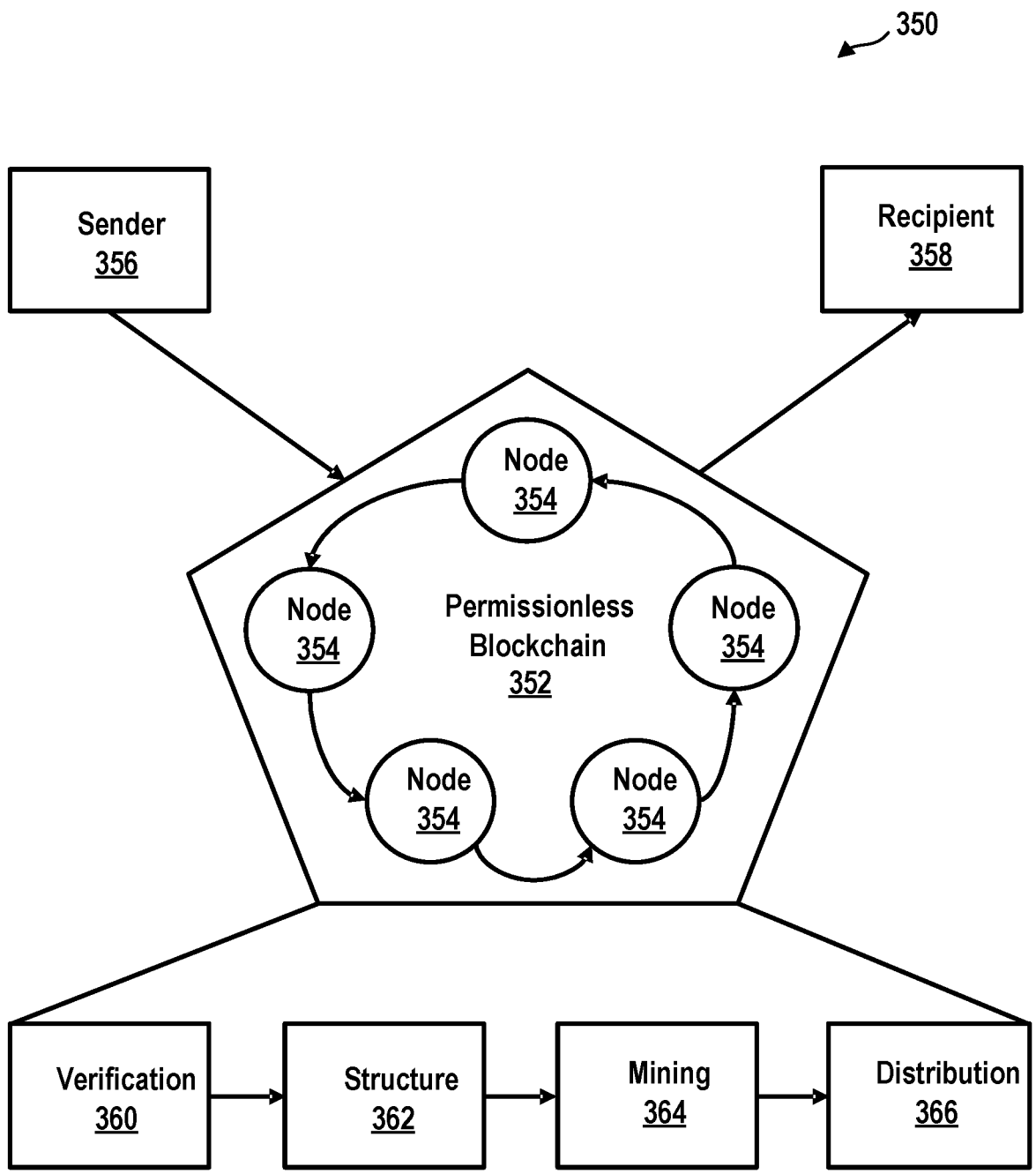
FIG. 3C is a block diagram that illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4:
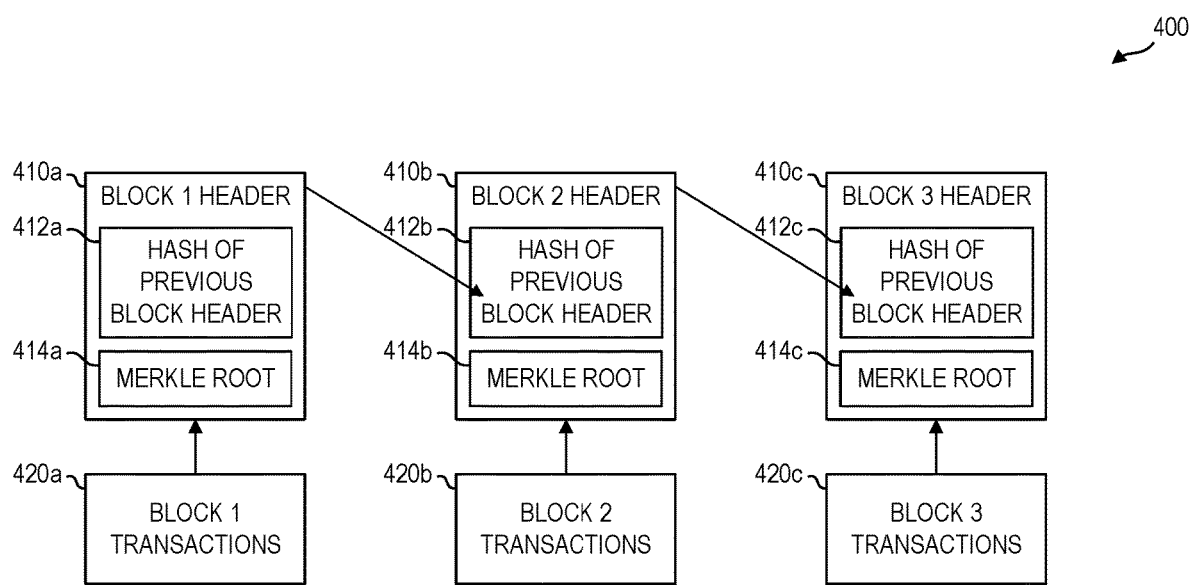
FIG. 4 is a block diagram that illustrates a basic blockchain sequence.

FIG. 4 is a block diagram that illustrates a basic blockchain sequence 400 of three transactions. The first block contains a first header 410a and a first group of transactions 420a making up the first block. The block header contains a hash 412a of the previous block header and a Merkle root 414a. The Merkle root 414a is a hash of all the hashes of all the transactions that are part of a block in a blockchain network that ensures data blocks passed between peers are whole, undamaged, and unaltered. The second block contains a second header 410b and a second group of transactions 420b making up the second block. The block header contains a hash 412b of the previous block header 410a and a Merkle root 414b. The third block contains a third header 410c and a third group of transactions 420c making up the third block. The block header contains a hash 412c of the previous block header 410b and a Merkle root 414c. The number of blocks may be extended to any feasible length and hash values may be checked/verified with relative ease.

Figure 5A:
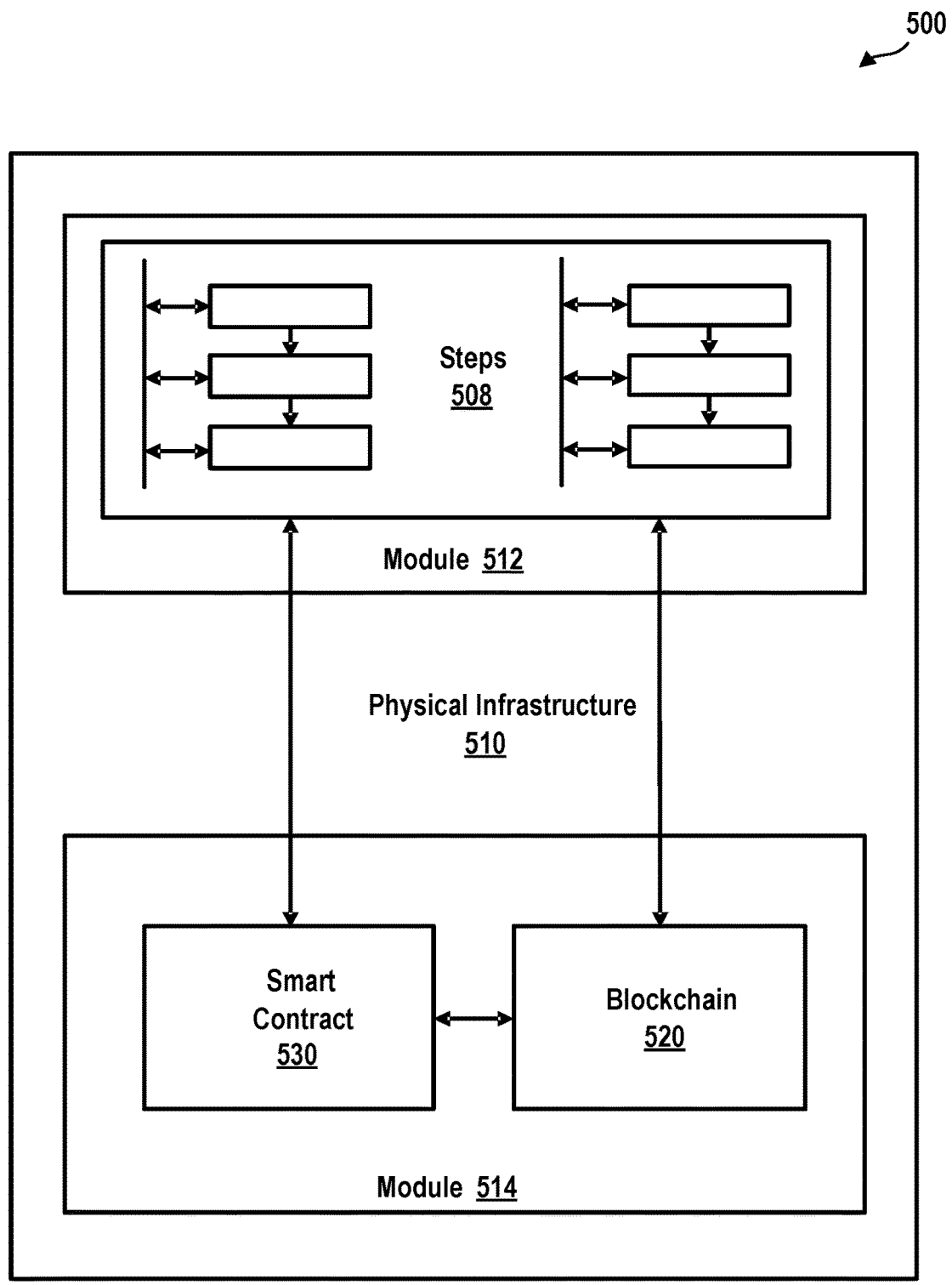
FIG. 5A is a block diagram that illustrates an example system configured to perform one or more operations described herein, according to example embodiments.

FIG. 5A illustrates an example system 500 that includes a physical infrastructure 510 configured to perform various operations according to example embodiments. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
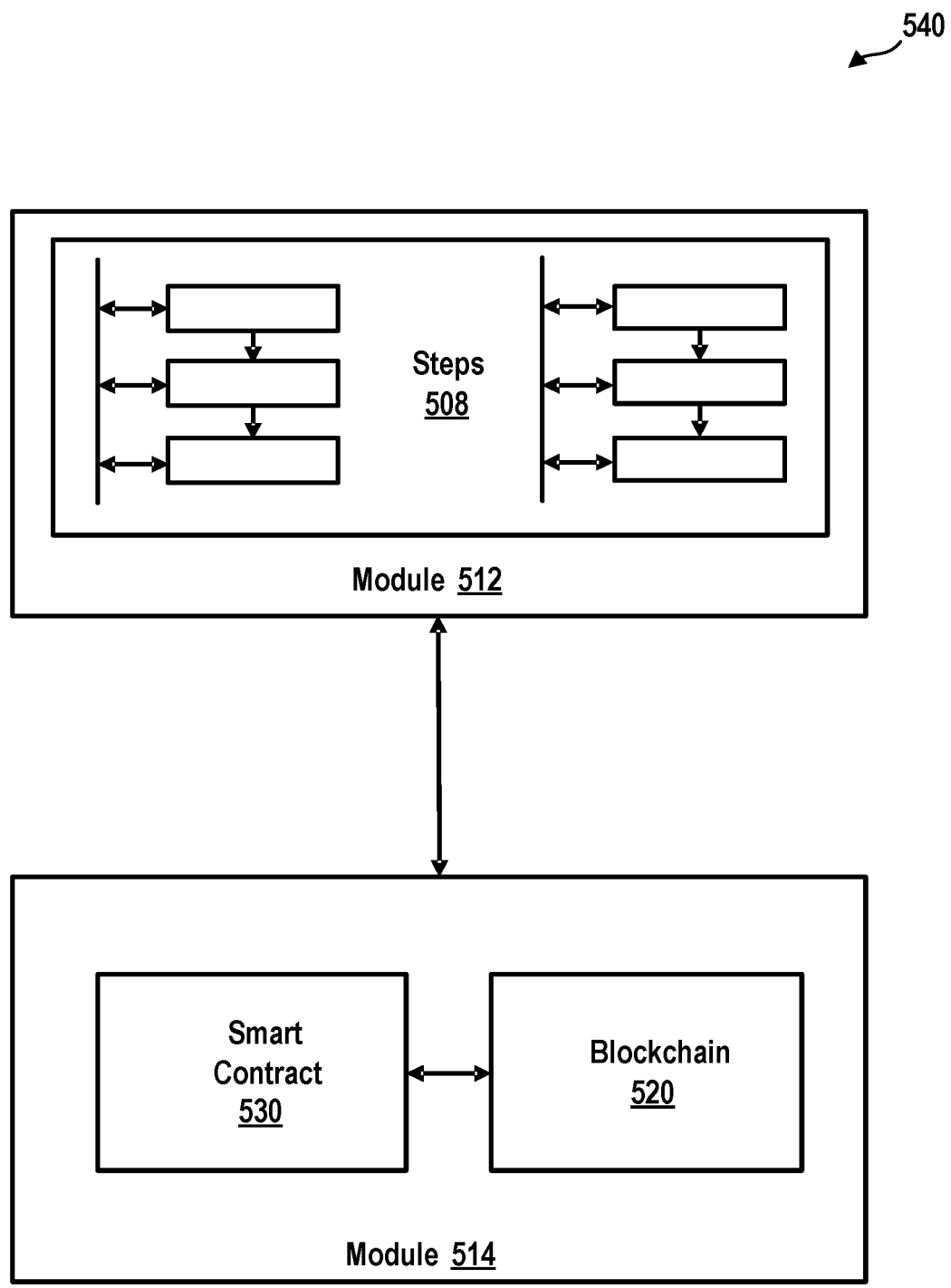
FIG. 5B is a block diagram that illustrates another example system configured to perform one or more operations described herein, according to example embodiments.

FIG. 5B illustrates another example system 540 configured to perform various operations according to example embodiments. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical module 512 and the module 514 may include one or more computers, servers, processors, memories, and/or wireless communication devices. Further, the module 512 and the module 514 may be a same module.

Figure 5C:
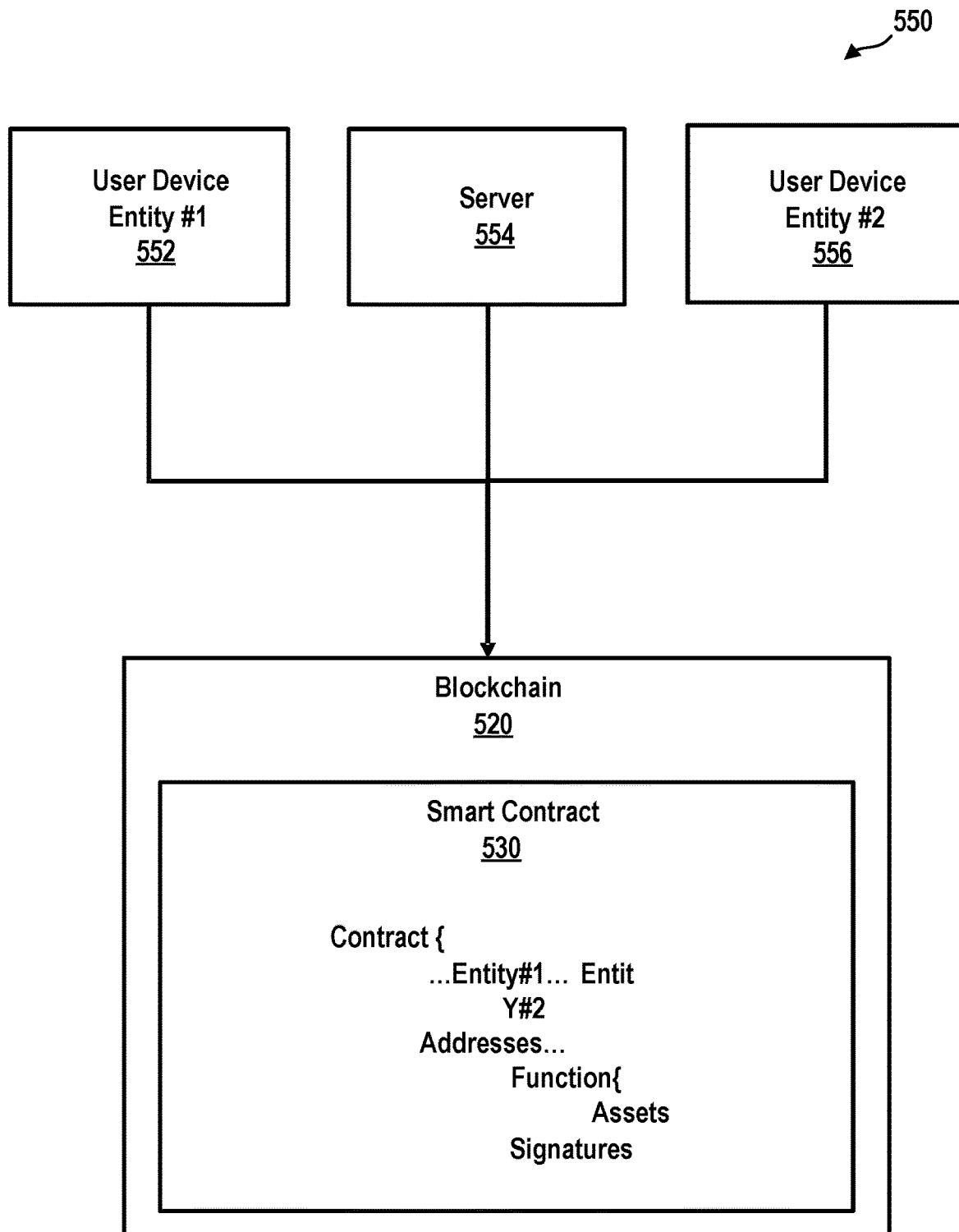
FIG. 5C is a block diagram that illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
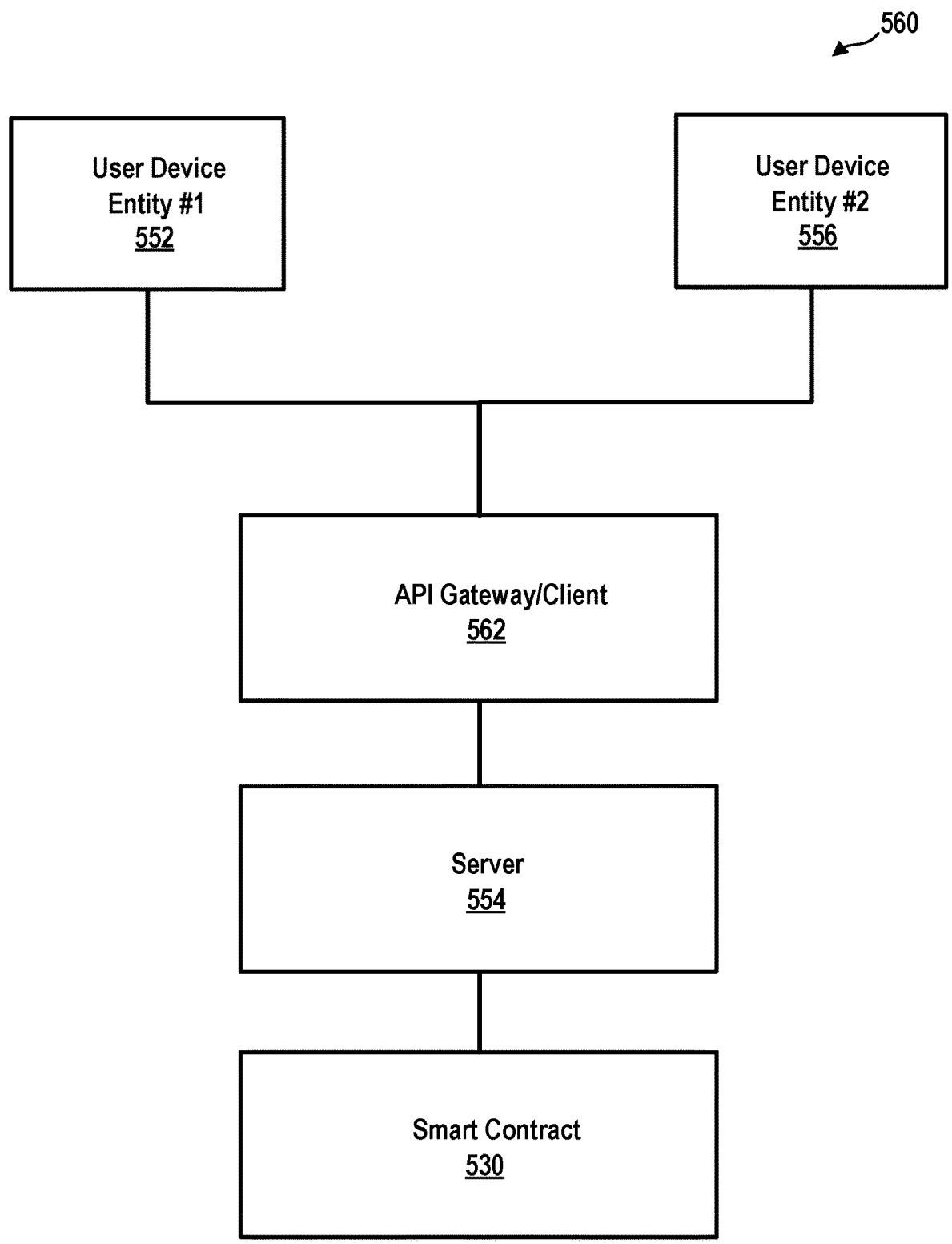
FIG. 5D is a block diagram that illustrates yet another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An example storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
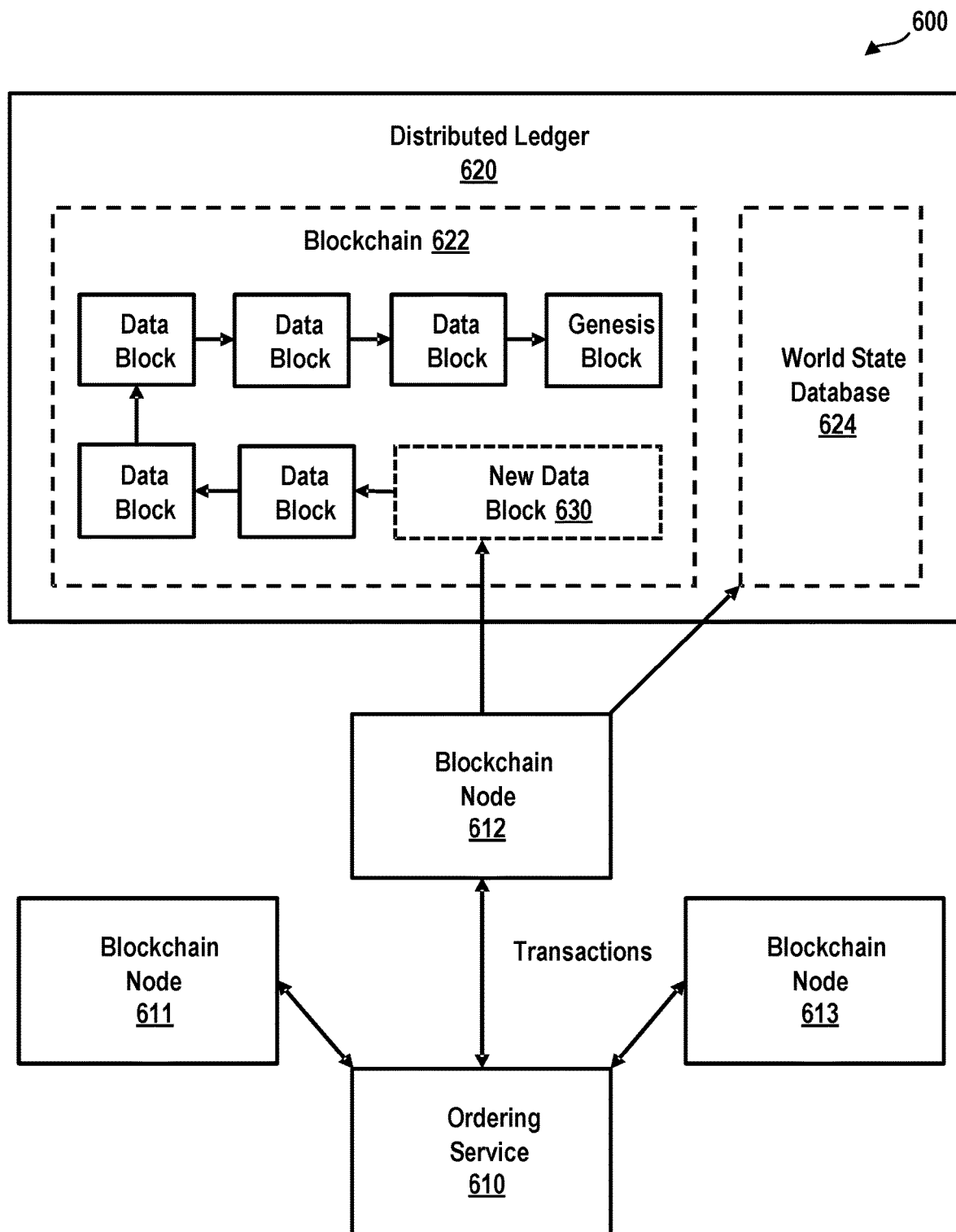
FIG. 6A is a block diagram that illustrates a process for a new block being added to a distributed ledger, according to example embodiments.
Figure 6B:
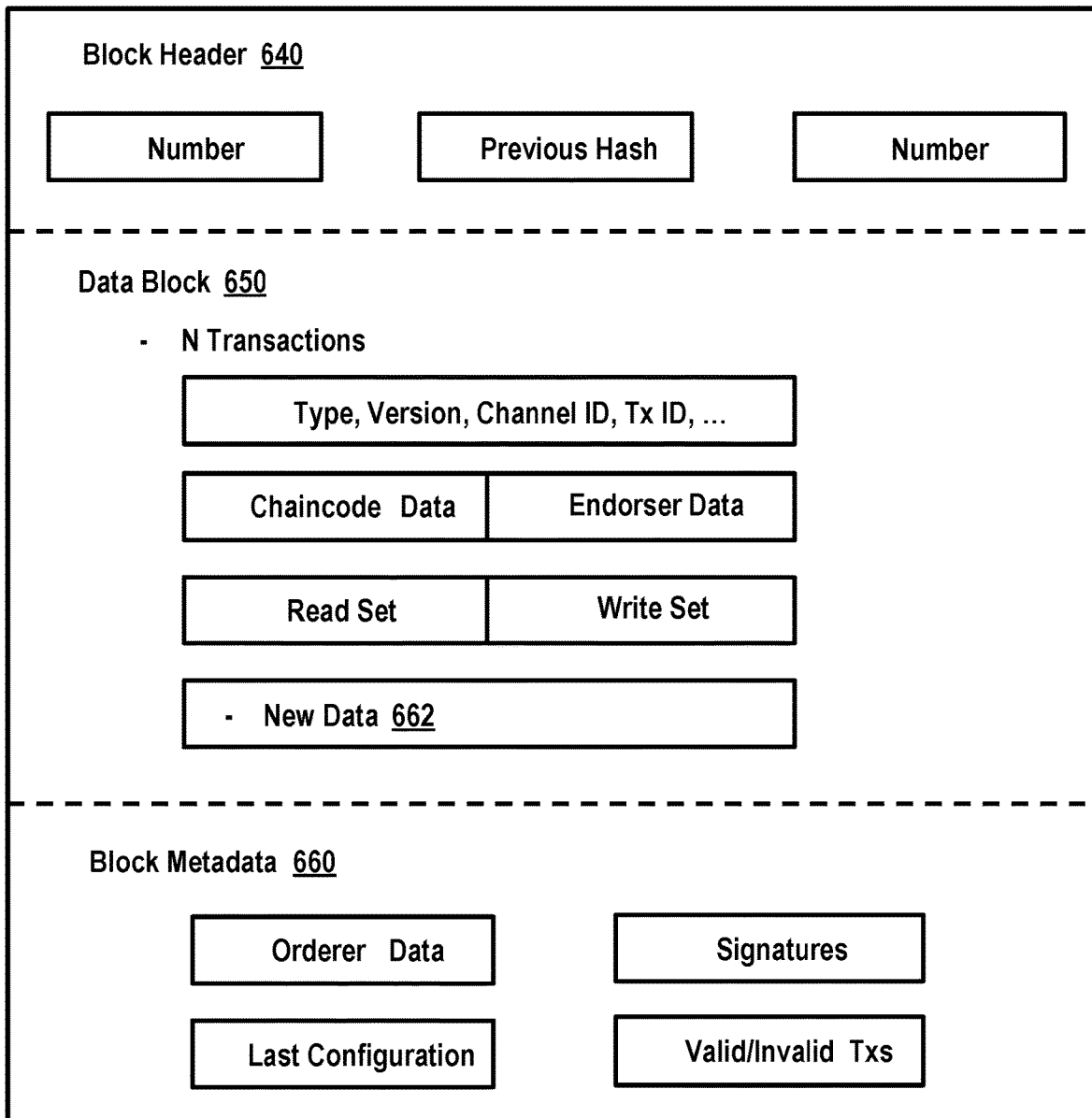
FIG. 6B is a block diagram that illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. The new data block 630 may contain document linking data.

Referring to FIG. 6A, clients (not shown) may submit transactions to blockchain nodes 611, 612, and/or 613. Clients may be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. Shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but could also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
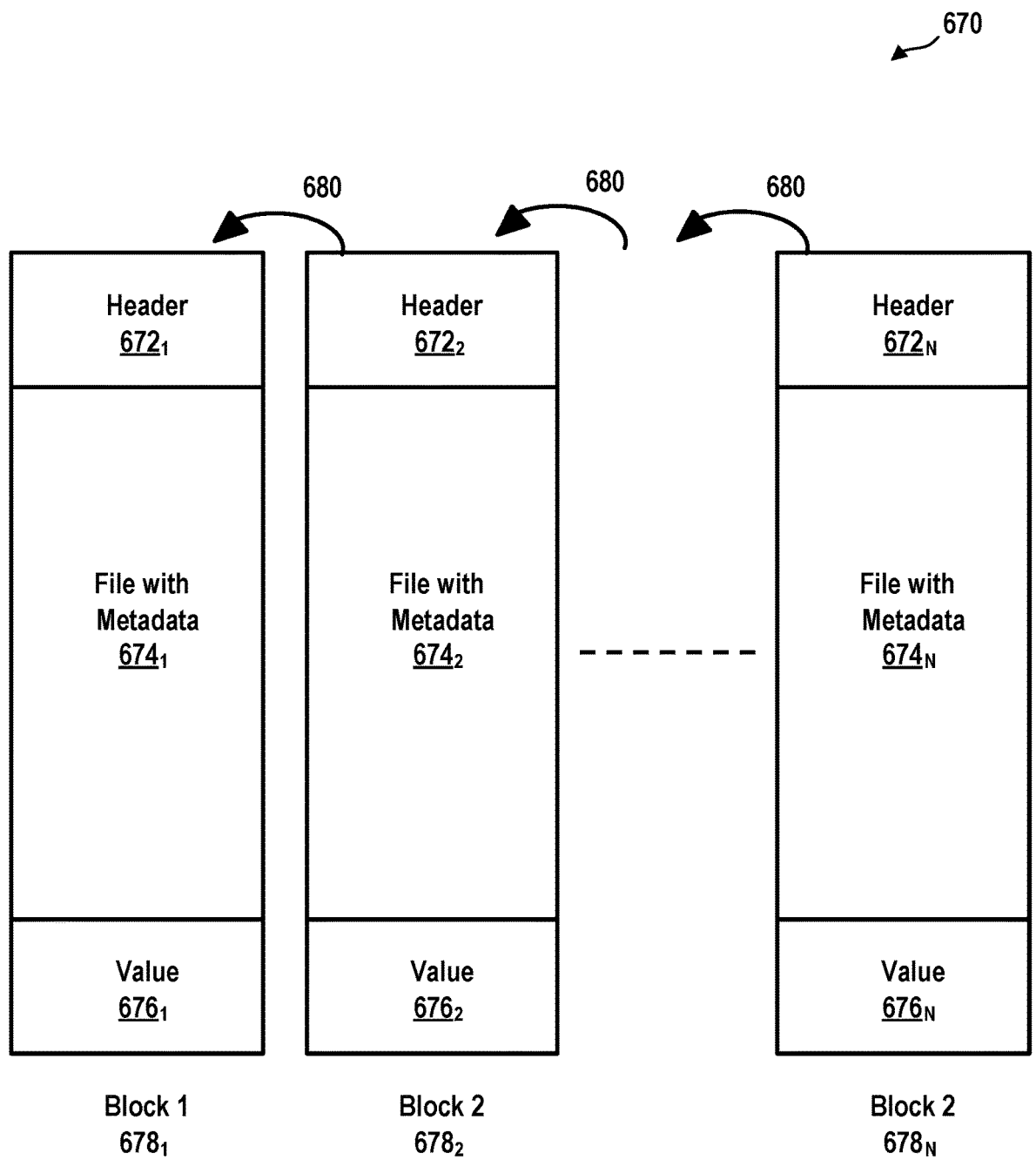
FIG. 6C is a block diagram that illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 6C, the blockchain 670 includes a number of blocks $678_1$, $678_2$, . . . $678_N$ cryptographically linked in an ordered sequence, where N≥1. The encryption used to link the blocks $678_1$, $678_2$, . . . $678_N$ may be any of a number of keyed or un-keyed Hash functions. In one embodiment, the blocks $678_1$, $678_2$, . . . $678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1$, $678_2$, . . . , $678_N$ may be cryptographically linked by a function that is different from a hash function. For purposes of illustration, the following description is made with reference to a hash function, e.g., SHA-2.

Each of the blocks $678_1$, $678_2$, . . . , $678_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $678_2$ to $678_N$ in the blockchain also have headers, files, and values. However, unlike the first block $672_1$, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
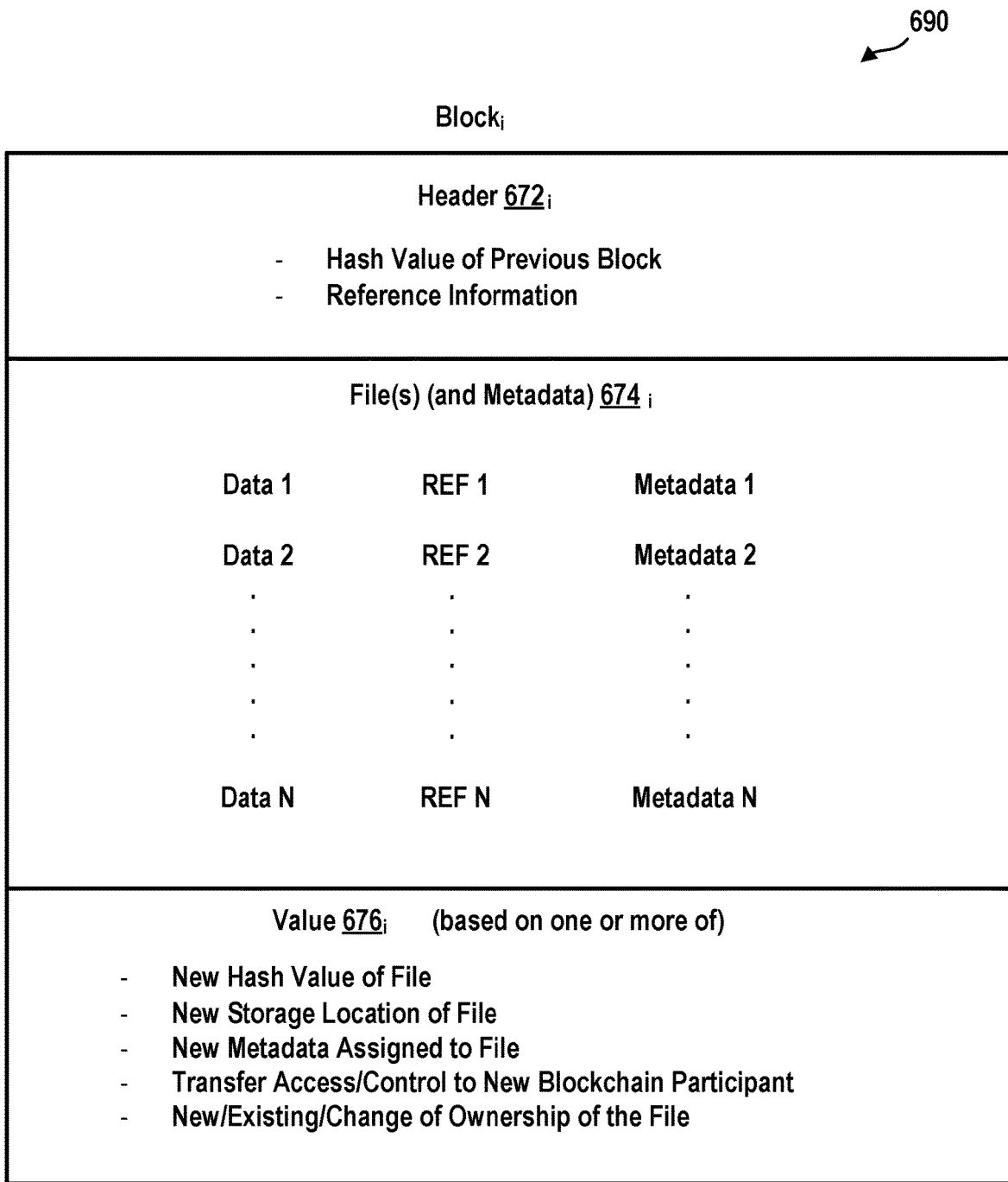
FIG. 6D is a block diagram that illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, ..., Data N in sequence. The data are tagged with Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, ..., $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 7A:
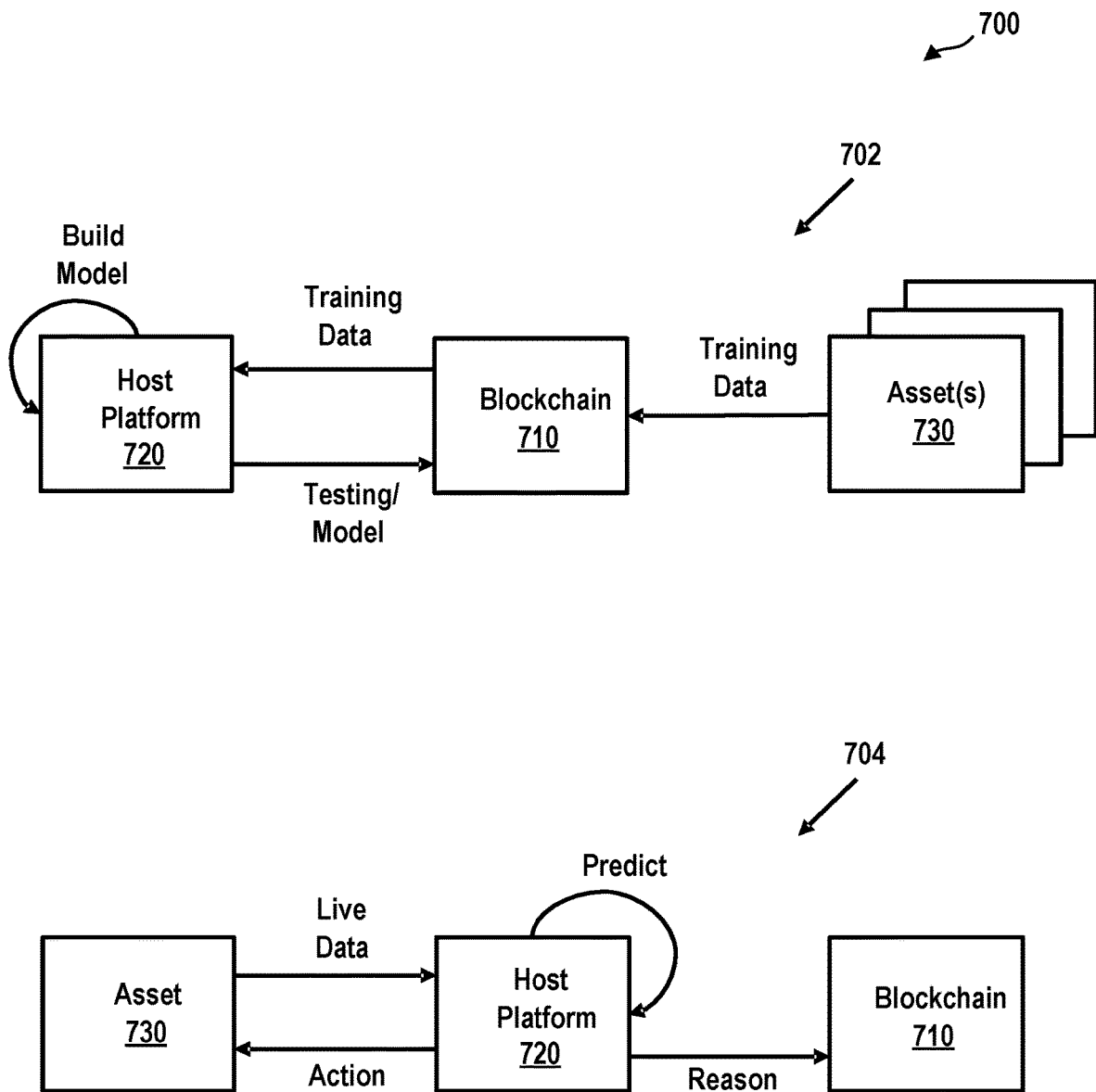
FIG. 7A is a block diagram that illustrates an example blockchain which stores machine learning (artificial intelligence) data, according to example embodiments.
Figure 7B:
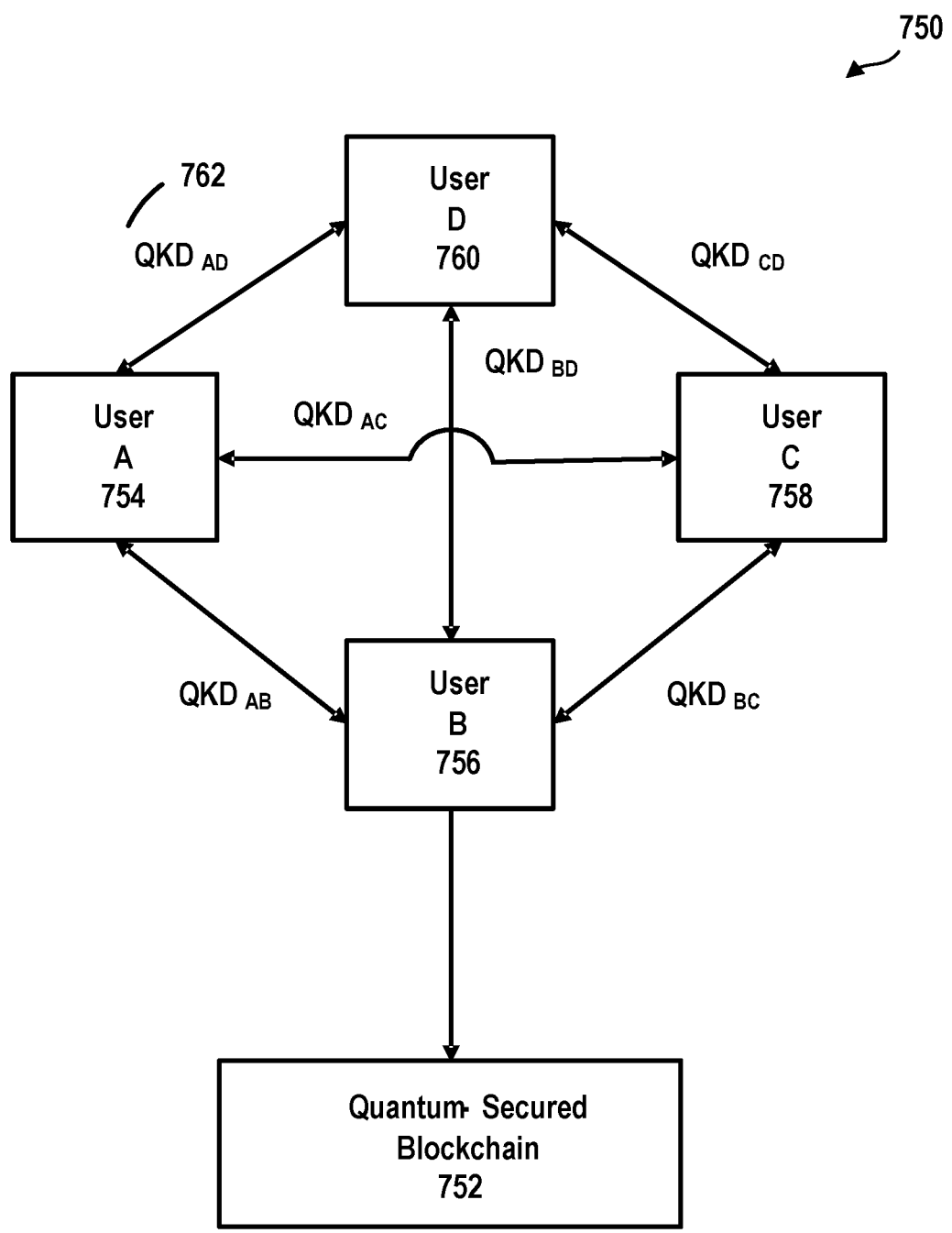
FIG. 7B is a block diagram that illustrates an example quantum-secure blockchain, according to example embodiments.

FIGS. 7A and 7B illustrate additional examples of use cases for blockchain which may be incorporated and used herein. In particular, FIG. 7A illustrates an example 700 of a blockchain 710 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 7A, a host platform 720 builds and deploys a machine learning model for predictive monitoring of assets 730. Here, the host platform 720 may be a cloud platform, an industrial server, a web server, a personal computer, a user device, and the like. Assets 730 can be any type of asset (e.g., machine or equipment, etc.) such as an aircraft, locomotive, turbine, medical machinery and equipment, oil and gas equipment, boats, ships, vehicles, and the like. As another example, assets 730 may be non-tangible assets such as stocks, currency, digital coins, insurance, or the like.

The blockchain 710 can be used to significantly improve both a training process 702 of the machine learning model and a predictive process 704 based on a trained machine learning model. For example, in 702, rather than requiring a data scientist/engineer or other user to collect the data, historical data may be stored by the assets 730 themselves (or through an intermediary, not shown) on the blockchain 710. This can significantly reduce the collection time needed by the host platform 720 when performing predictive model training. For example, using smart contracts, data can be directly and reliably transferred straight from its place of origin to the blockchain 710. By using the blockchain 710 to ensure the security and ownership of the collected data, smart contracts may directly send the data from the assets to the individuals that use the data for building a machine learning model. This allows for sharing of data among the assets 730.

The collected data may be stored in the blockchain 710 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 720. Each round may be based on additional data or data that was not previously considered to help expand the knowledge of the machine learning model. In 702, the different training and testing steps (and the data associated therewith) may be stored on the blockchain 710 by the host platform 720. Each refinement of the machine learning model (e.g., changes in variables, weights, etc.) may be stored on the blockchain 710. This provides verifiable proof of how the model was trained and what data was used to train the model. Furthermore, when the host platform 720 has achieved a finally trained model, the resulting model may be stored on the blockchain 710.

After the model has been trained, it may be deployed to a live environment where it can make predictions/decisions based on the execution of the final trained machine learning model. For example, in 704, the machine learning model may be used for condition-based maintenance (CBM) for an asset such as an aircraft, a wind turbine, a healthcare machine, and the like. In this example, data fed back from the asset 730 may be input the machine learning model and used to make event predictions such as failure events, error codes, and the like. Determinations made by the execution of the machine learning model at the host platform 720 may be stored on the blockchain 710 to provide auditable/verifiable proof. As one non-limiting example, the machine learning model may predict a future breakdown/failure to a part of the asset 730 and create alert or a notification to replace the part. The data behind this decision may be stored by the host platform 720 on the blockchain 710. In one embodiment the features and/or the actions described and/or depicted herein can occur on or with respect to the blockchain 710.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 7B illustrates an example 750 of a quantum-secure blockchain 752 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 7B, four users are present 754, 756, 758, and 760. Each of pair of users may share a secret key 762 (i.e., a QKD) between themselves. Since there are four nodes in this example, six pairs of nodes exist, and therefore six different secret keys 762 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 752 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 754-760) authenticate the transaction by providing their shared secret key 762 (QKD). This quantum signature can be attached to every transaction making it exceedingly difficult to tamper with. Each node checks their entries with respect to a local copy of the blockchain 752 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 752. In one embodiment the features and/or the actions described and/or depicted herein can occur on or with respect to the blockchain 752.

Figure 8:
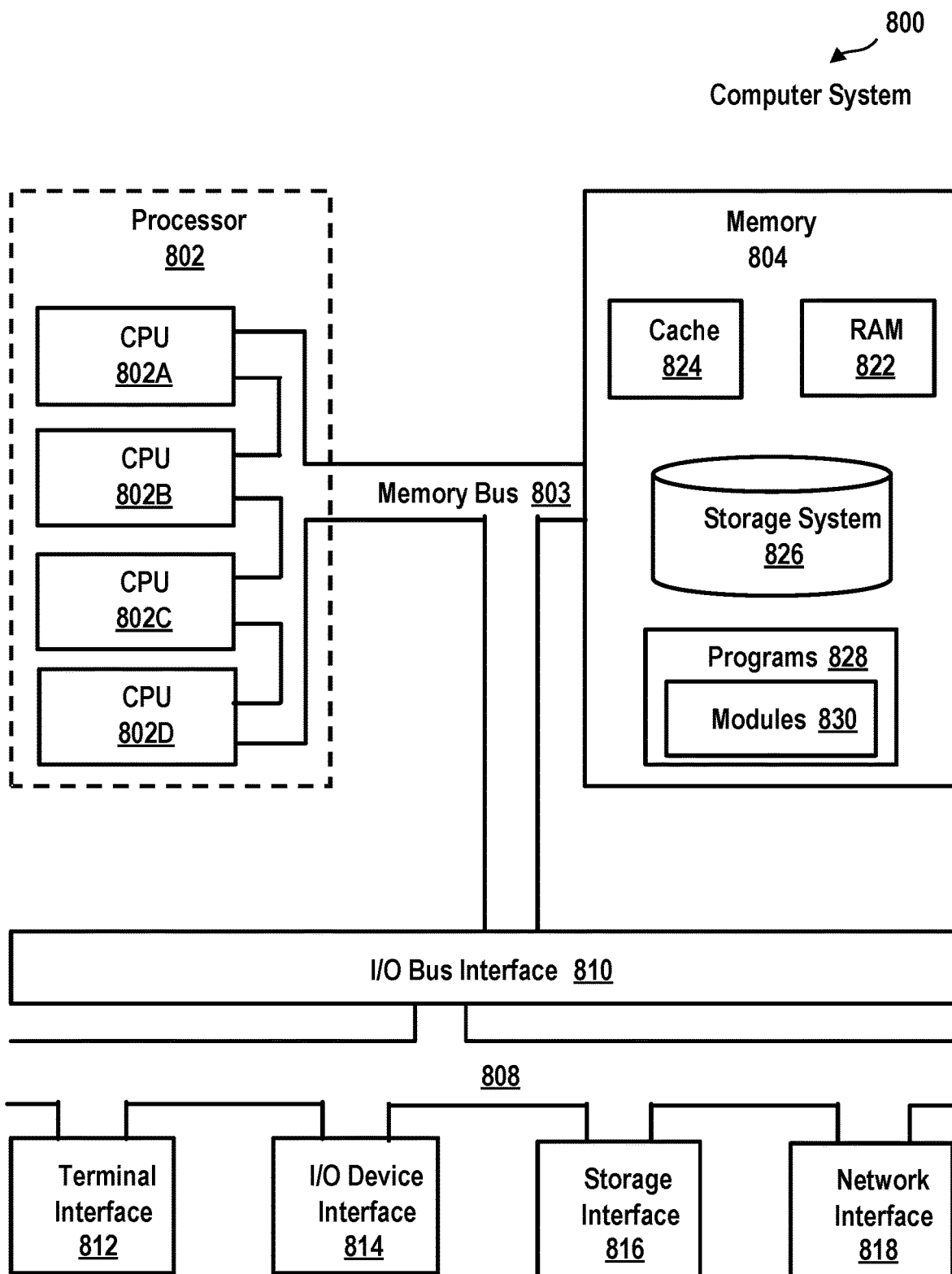
FIG. 8 is a block diagram that illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 800 that may be used in implementing one or more of the methods, tools, and modules, and any related functions, described herein (e.g., using one or more processor circuits or computer processors of the computer), in accordance with embodiments of the present disclosure. This computer system may, in some embodiments, be a DPS 10 as described above. In some embodiments, the major components of the computer system 800 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 800 may contain one or more general-purpose programmable central processing units (CPUs) 802A, 802B, 802C, and 802D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 800 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 800 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface, but receives requests from other computer systems (clients). Further, in some embodiments, the computer system 800 may be implemented as a desktop computer, portable computer, laptop or notebook computer, tablet computer, pocket computer, telephone, smartphone, network switches or routers, or any other appropriate type of electronic device.

FIG. 8 depicts the representative major components of an example computer system 800. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Cross-Shard Private Atomic Commit

System Overview

This disclosure considers a client-driven cross-shard private atomic commit model in which the blockchain is divided into multiple privacy-preserving shards in the blockchain that all share the same ledger. The blockchain is sharded and the present system retains total order across shards. There are several techniques of making a transaction be committed atomically across different servers, and one of them is a two-phase commit. According to various embodiments, such a two-phase commit protocol is provided that achieves an atomic commit of transactions between multiple shards while preserving the confidentiality of the parties that participate in the transaction while preserving data consistency across all parts of the transaction. Although the data is written in stages (and thus is not atomic), any application observing each of the nodes sees an atomic view at each point in time. The atomic commit operation applies a set of distinct changes as a single operation. If the changes are applied, then the atomic commit is said to have succeeded. If there is a failure before the atomic commit can be completed, then all of the changes completed in the atomic commit are reversed. This ensures that the system is always left in a consistent state. Another property of isolation comes from their nature as atomic operations. Isolation ensures that only one atomic commit is processed at a time. Atomic commits are often used in database systems and version control systems, and, as here, in digital ledger applications. In various embodiments of the present disclosure, the private atomic commit may be achieved with two separate transactions: the prepare transaction (operation 1120 in FIG. 11 below), and the decide transaction (operation 1135 in FIG. 11 below).

Put another way, the privacy aspects of the shards are considered along with how to ensure an atomic commit of transactions between multiple shards while maintaining privacy. Here, transactions may be processed in a way that hides the transaction parts from the different parties and does not require any assistance from an external server. This may be achieved by, e.g., providing, on the public blockchain, only hashes or information which is incomprehensible for non-participating parties. An out-of-band communication protocol may be used for private atomic commits, and related information, such as the read-write sets (RWSets), endorsements on RWSets and endorsing node identifiers, is provided in such out-of-band communications.

In addition to the transactions spanning multiple shards, parties that do not participate in a transaction cannot know which shards are involved. Various embodiments use a hash puzzle to ensure a unanimous commit or abort of a transaction while ensuring that only the participating shards know about their participation among all shards in the network. In this model: clients may fail or be malicious; shards do not leak data; shards may fail or be unavailable; and each shard has a secret symmetric key $K_s \in \{0,1\}^{256}$ (being symmetric, no public key counterpart exists), chosen uniformly at random and known only to shard peers. Malicious behavior by the client may be avoided by using signatures. The symmetric keys of the shards are used to ensure that a shard member (a server belonging to a shard) that was offline during the pre-image dissemination phase (the step before the prepare transaction) knows that it needs to search for the pre-images in its fellow shard members for a specific transaction it sees (the hash) in the blockchain. Without using the encryption, any information that is used by the server whose shard participated in the transaction could also be used by shards unrelated to the transaction to figure out who the participating shards (in the transaction) are. To solve this, the participating shards utilize a secret advantage (the symmetric key in the present case) that the participating shard has and the non-participating shards do not. The use of signatures for clients simply ensures that un-authorized parties (clients) cannot transact on the blockchain.

A brief summary of the prepare and commit operations is provided here before focusing on a more detailed explanation below. In the prepare transaction operation, a client sends a proposal to peers in shards. The peers then execute, endorse, and save locally, within each shard, the read write sets and endorsements. Each peer returns two signed hash commitments: one for YES and one for NO. The client disseminates the signed hash commitments among shards, and then appends to the blockchain a prepare transaction with commitments but without the signatures. The prepare transaction locks the read sets within each shard.

In the commit transaction operation, the client waits for the prepare transaction to be committed in all shards. The client then asks each shard whether the endorsements that correspond to the commitments had multi-version concurrency control (MVCC) conflicts or an endorsement policy failure. The shards return to the client decommitments to either YES or NO accordingly. The client appends to the blockchain a commit transaction with the decommitments. If all decommitments are YES, shards apply write sets, and in any case the read set locks are released. "Commitment" is a known technique, and is essentially a way of saying, "I am hiding a value from you and promise that when I reveal the value, I can only reveal the same value which I used when I hid it from you". The "decommitment" is then simply revealing that value.

Figure 9:
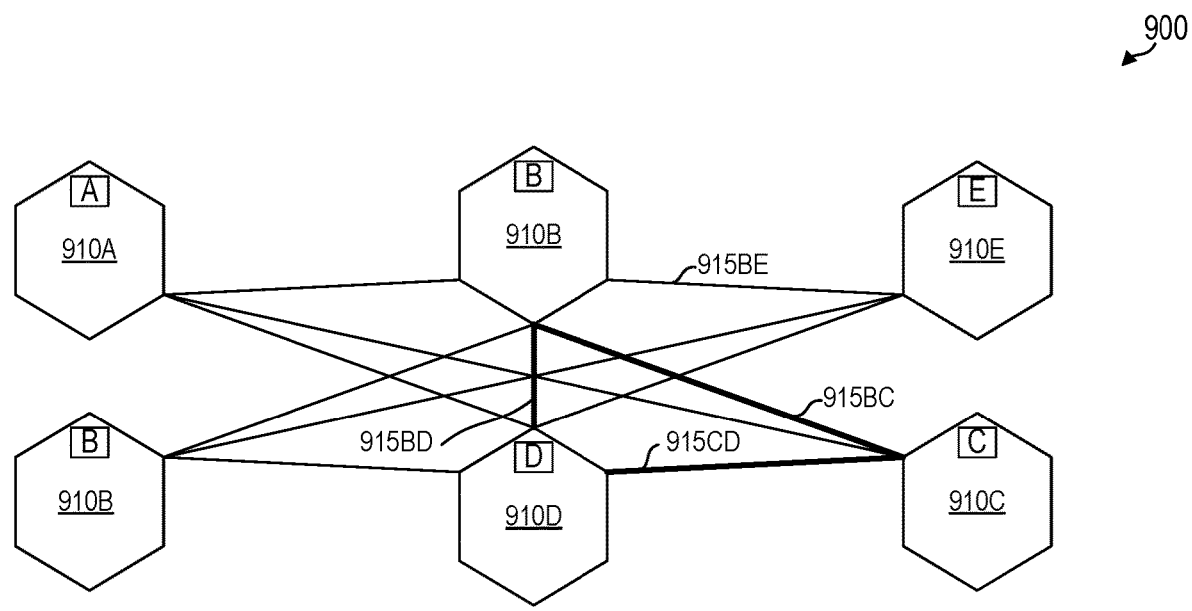
FIG. 9 is a block diagram illustrating shards of a blockchain ledger, according to some implementations.
Figure 10A:
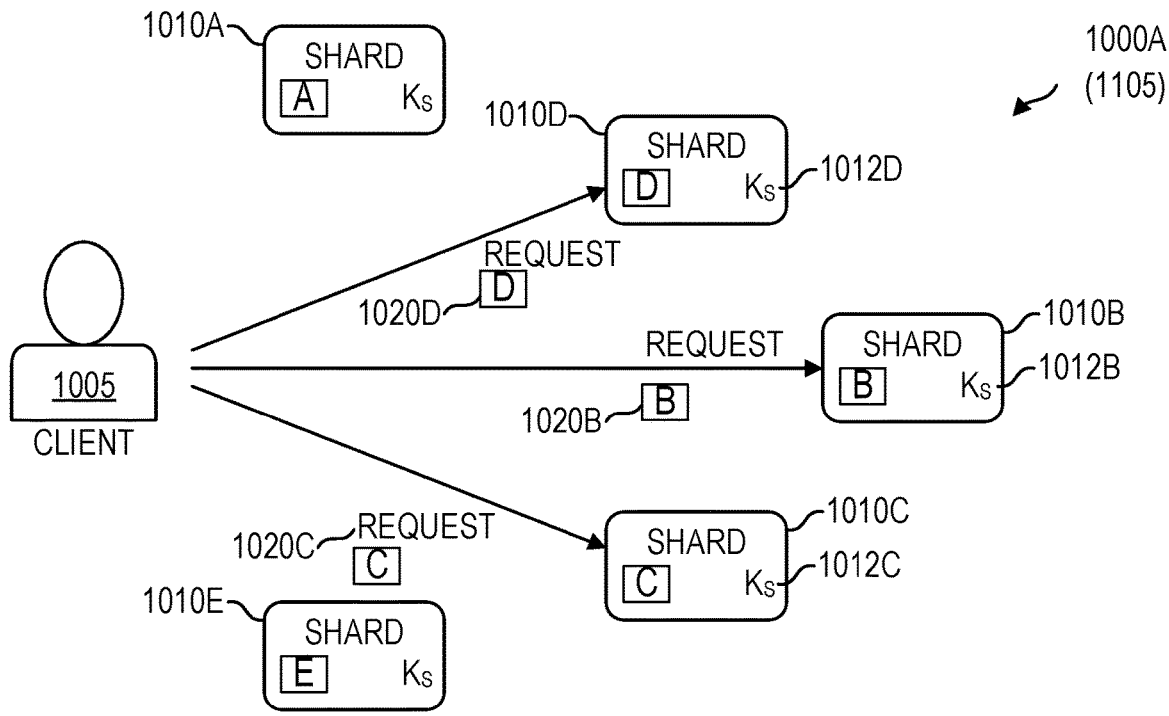
FIG. 10A is a block diagram of a first state in a sharded transaction, according to some implementations.
Figure 10B:
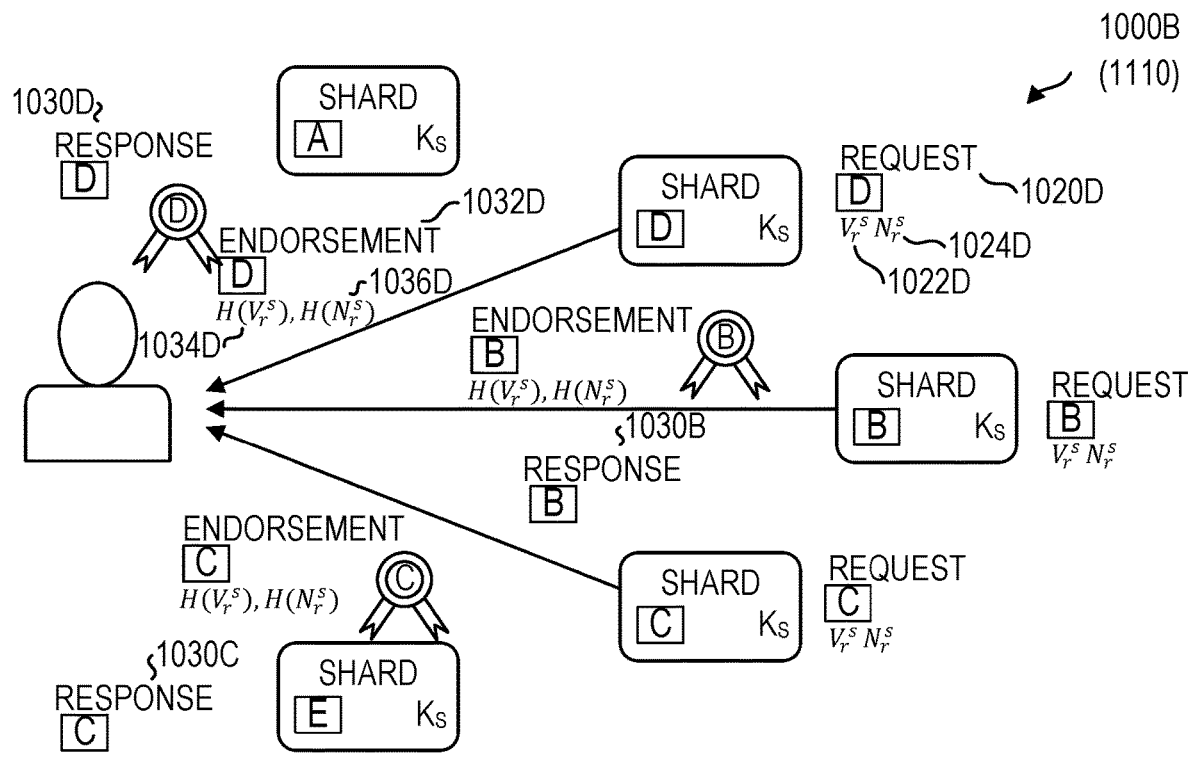
FIG. 10B is a block diagram of a second state in a sharded transaction, according to some implementations.
Figure 10C:
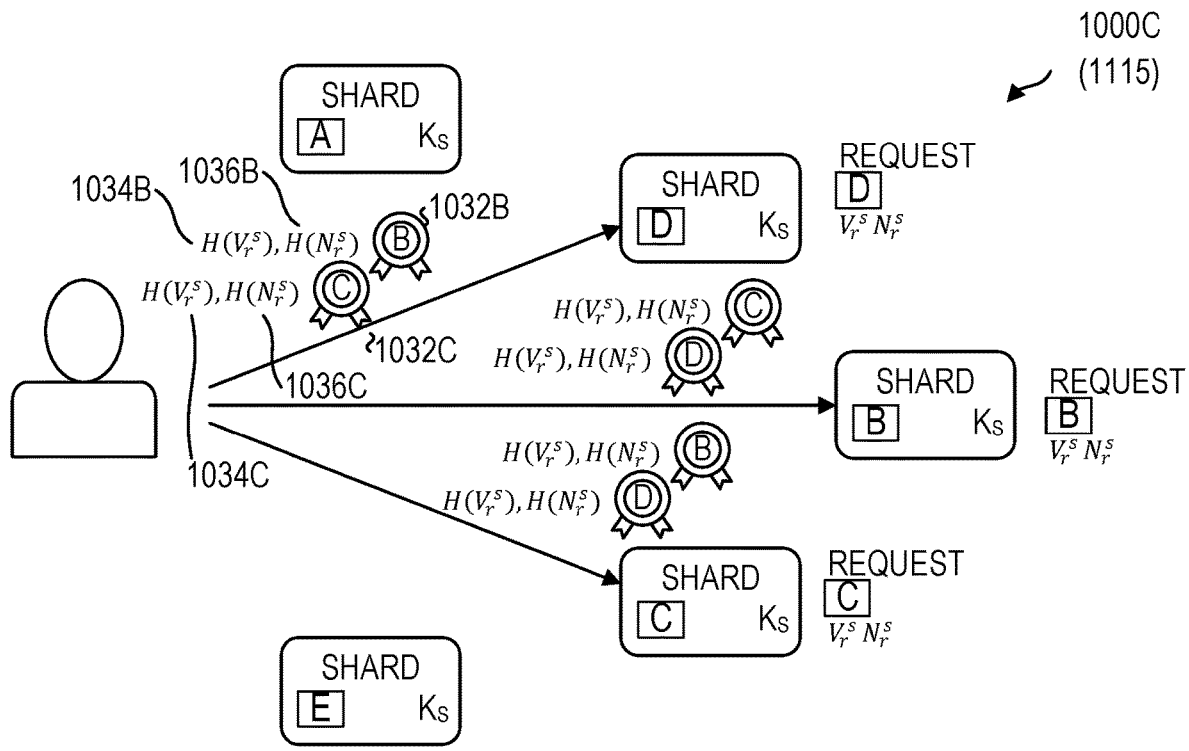
FIG. 10C is a block diagram of a first state in a sharded transaction, according to some implementations.
Figure 10D:
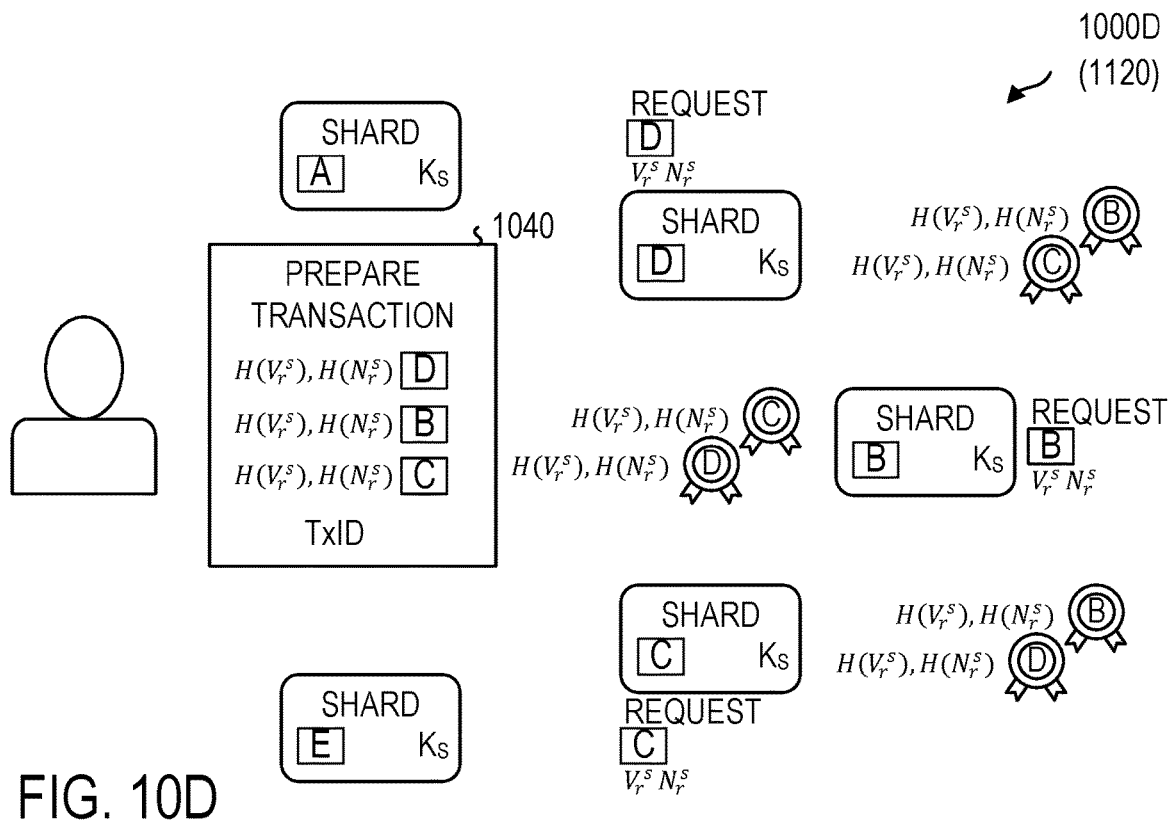
FIG. 10D is a block diagram of a first state in a sharded transaction, according to some implementations.
Figure 10E:
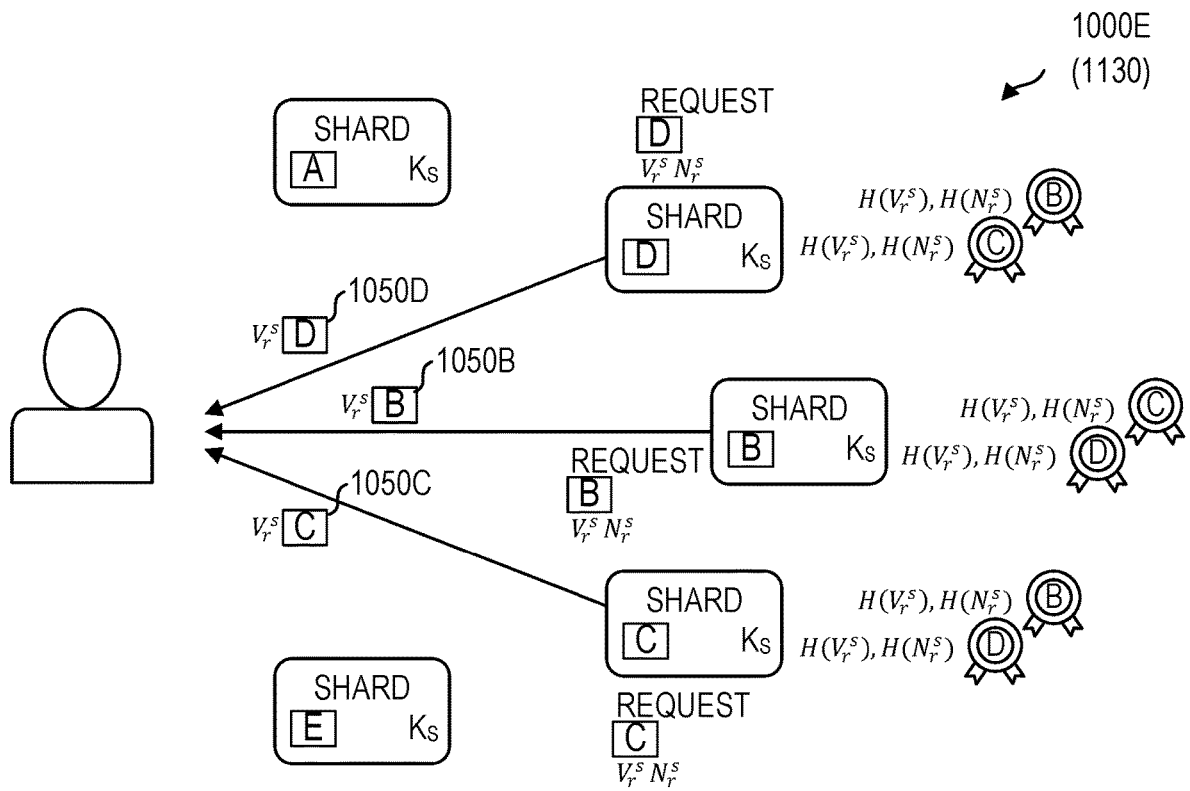
FIG. 10E is a block diagram of a first state in a sharded transaction, according to some implementations.
Figure 10F:
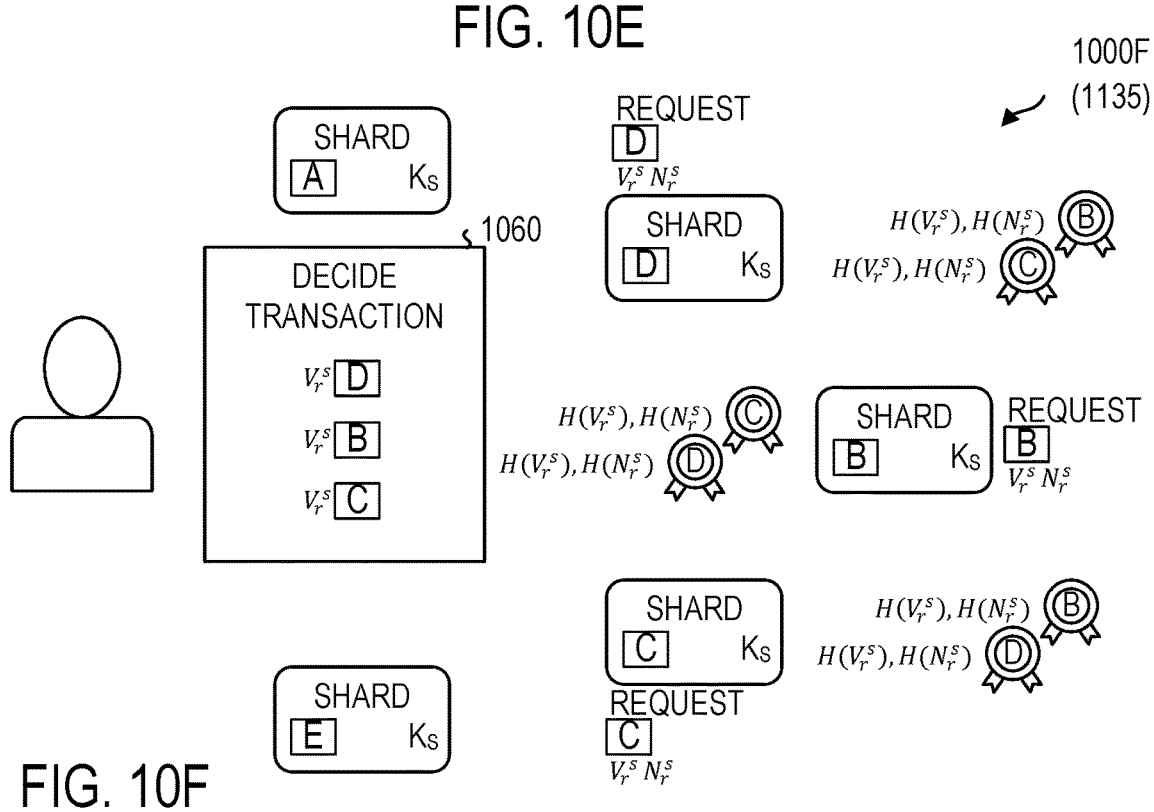
FIG. 10F is a block diagram of a first state in a sharded transaction, according to some implementations.
Figure 11:
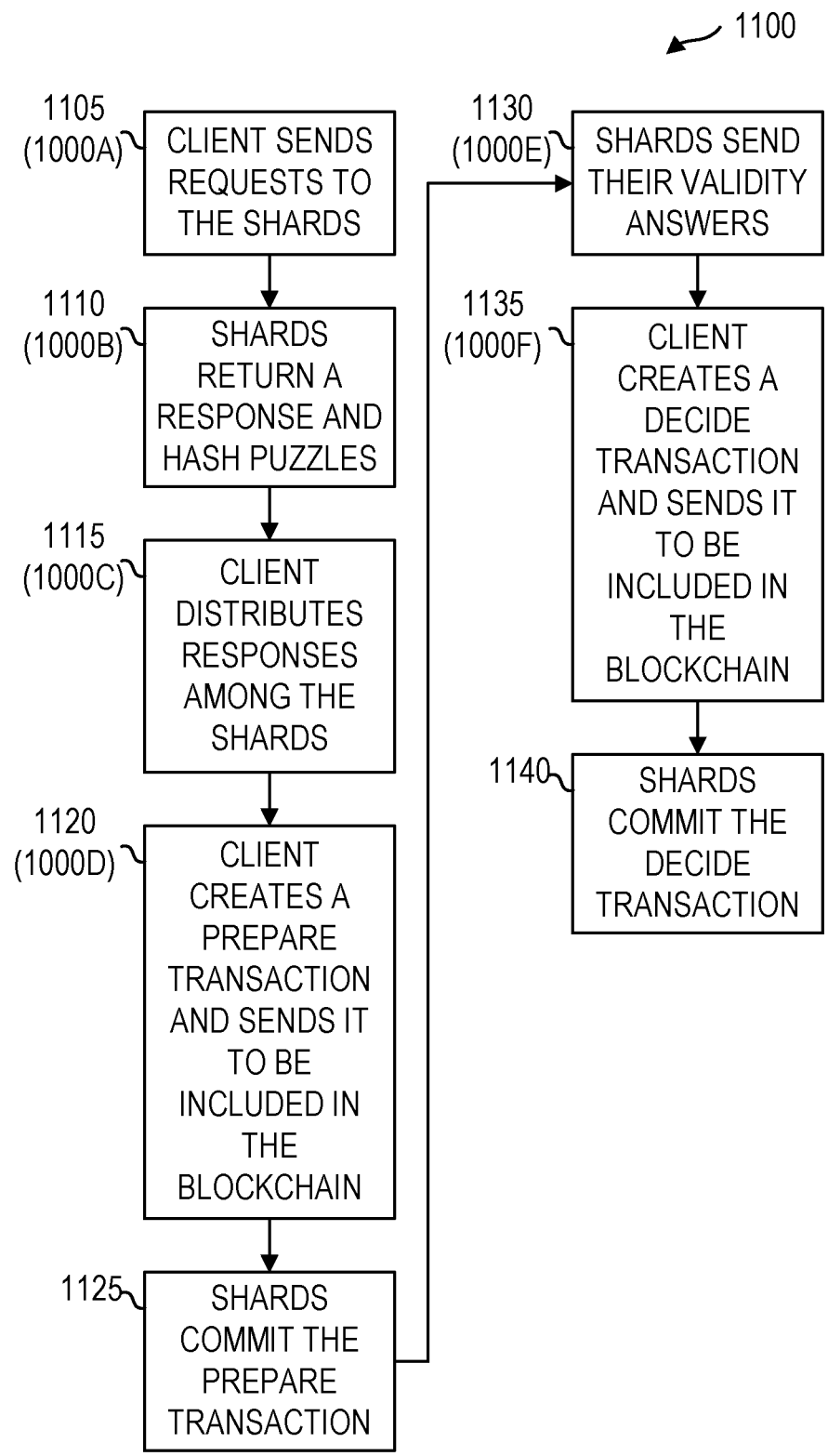
FIG. 11 is a flowchart illustrating a process of recording a transaction in a sharded blockchain ledger

The model operates as shown in FIGS. 9-11 with a blockchain shard model 900 in FIG. 9, block diagrams of shard states 1000 in FIGS. 10A-10F, and a flowchart of a process 1100 for implementing cross-shard private atomic commit in FIG. 11. Since the model, states, and process make reference to one another, a discussion of the various components will be intermingled. Furthermore, when using reference numbers having a letter appended to the end, use of the reference number without the letter may refer either to a representative element or to all of the elements having that reference number collectively.

FIG. 9 is a block diagram illustrating a blockchain 900 that has been divided into private shards 910A, 910B, 910C, 910D. Although all of these shards 910 are a part of a same ledger, as illustrated by the interconnecting lines 915, not all of them participate in a particular transaction. The bold interconnecting lines 915BC, 915BD, 915CD illustrate a particular transaction involving shard B 910B, shard C 910C, and shard D 910D. The lighter line 915BE shows, by way of example, that although shard E 910E is a part of the ledger, it is not participating in this particular transaction.

What is observed by shard members varies based on whether a particular member of a shard took part in the transaction or not. By way of an illustrative example, if shard D 910D took part in the transaction, it can observe that the transaction is valid for shard B 910B, but is invalid for shard C 910C, and therefore, the transaction should be ignored. If a shard did not take part in the transaction, all it can observe is that a transaction occurred between three parties that do not include itself, but can access nothing more that the transaction ID.

Summarizing a part of the process, the client sends requests, and the shards simulate the requests and endorse the simulation results, returning endorsements. Since this transaction is divided into different parts, and each shard is committing its own part but not the other parts, there may be a problem of consistency: from the time of transaction execution to the time where it gets into a block and then to the blockchain nodes, there could have been another conflicting transaction sent by another client that the shards endorsed as well. This other transaction could have gotten to the blockchain before the first transaction. In such a case, the first transaction (that reached the blockchain later) should be marked invalid by the nodes of the shards due to the conflict with the previous transaction.

This works well in the current state of the art of a blockchain framework because there are no shards, hence all, nodes see the entire RWSet. However, in the present system, this is not the case. Each shard can only see a subset of the union of all RWSets across all parts of the transaction. In this case, a conflict may happen in only one of the shards, but not in all of them. This would make one shard skip the transaction because of seeing the conflict and considering it invalid, while the other shards may adopt it, considering it valid. This is a bad result, since consistency is lost. This situation is resolved, according to various embodiments disclosed herein, by dividing the commit stage into two phases: in the first (prepare) phase, the shard declares its intentions regarding the transaction, and each shard says, in essence, to the other shards:

I do not know yet if, in the next phase, I will conclude that this transaction is valid or not. However, if I will declare the transaction as valid, I will indicate this by exposing the pre-image of the hash of $K_s(\text{TxID}\|\text{``1''})$, and, if I will declare the transaction as invalid, I will share the pre-image of the hash of $K_s(TxID\|\text{``0''})$ (discussed below).

In the prepare phase, the hashes $H(K_s(TxID\|\text{``1''}))$ and $H(K_s(TxID\|\text{``0''}))$ are put in some known and consistent order. Then, in the decide phase, each shard "exposes" whether the RWSets of the transaction conflicts with a (valid) transaction that has been committed earlier.

The actual value of $(TxID\|\text{``1''})$ or $(TxID\|\text{``0''})$ is used by each node of a shard when it decrypts the encryption of $K_s$ and yields either $TxID\|\text{``1''}$ or $TxID\|\text{``0''}$ and it then sees if the transaction ID (TxID) in the decrypted value is equal to the transaction ID in the transaction. This way the node knows if its shard is part of this transaction or not, so the node knows if it needs to search for the endorsements from the other participating shard members or not.

FIG. 10A is a block diagram illustrating a first state 1000A corresponding to operation 1105 in the flowchart of FIG. 11. In FIG. 10A, the client 1005 has sent individual requests (parts of the private transaction) to each participating shard (a request B 1020B to shard B 1010B, a request C 1020C to shard C 1010C, and a request D 1020D to shard D 1010D) to orchestrate the private transaction in the ledger over multiple shards. Other ledger shards (e.g., shard A 1010A and shard E 1010E) are not involved in the requests 1020B-1020D. The shards 1010 may each utilize their own secret/private key $K_s$ 1012B-1012D. All requests contain the same transaction identifier (TxID).

The peers of the corresponding shards execute the requests and endorse the read-write sets (RWSets), but the RWSets do not end up being part of the public ledger. Clients send a transaction which will later be committed to the public ledger, and marks the RWSets across all shards to be either valid or invalid. The atomic-private commit of the transaction is ultimately achieved in that individual endorsements may be (independently) invalid due to the multi version concurrency control (MVCC) checks or endorsement policy checks. If all endorsements are valid, then the entire transaction (all endorsements across all shards) should be committed—otherwise, the entire transaction should have no effect on the state of the ledger.

FIG. 10B is a block diagram illustrating a second state 1000B corresponding to operation 1110. In FIG. 10B, the participating shards 1010B-1010D have returned a response that is the shards' execution of the requests, each comprising an RWSet and hash puzzles. Each participating shard S (1010) uses their private key $K_s$ (1012) to encrypt two values $V_r^s$ 1022 and $N_r^s$ 1024:

$$V_r^s \leftarrow K_s(TxID\|\text{``1''})$$

$$N_r^s \leftarrow K_s(TxID\|\text{``0''})$$

where:
s=shard
r=request
$K_s$=shard private key
$K_s(x)$=encryption of x with shard private symmetric key
TxID=transaction ID
$K_s(TxID\|\text{``0''})$=pre-image to a hash (not valid)
$K_s(TxID\|\text{``1''})$=pre-image to a hash (valid)
$V_r^s$=shorthand for the pre-image to a hash (valid) of shard s for request r
$N_r^s$=shorthand for the pre-image to a hash (not valid) of shard s for request r
For shard D 1010D, the private key $K_s$ is 1012D, and the two values are $V_r^s$ 1022D and $N_r^s$ 1024D. Reference numbers have been omitted for the two values for shard B 1010B and shard C 1010C for the sake of clarity, but the structure is the same.

Each participating shard S 1010 returns to the client 1005 a signed response 1030 that contains:
The endorsement 1032 (a signature over the TxID, and the RWSet)
$H(V_r^s)$ 1034=a hash puzzle of $V_r^s$
$H(N_r^s)$ 1036=a hash puzzle of $N_r^s$ Reference numbers have been provided for the signed response 1030D containing the two hash puzzles 1034D and 1036D. Reference numbers have been omitted for the two values of the response 1030B from shard B 1010B and the response 1030C for shard C 1010C for the sake of clarity, but the structure is the same.

FIG. 10C is a block diagram illustrating a third state 1000C corresponding to operation 1115. All peers in the shard should obtain the endorsement in order to be able to apply the RWSet when the decide transaction is seen (operations 1135 and 1140). In some embodiments, when the client 1005 receives back the endorsements 1032, it sends them to the remaining peers of all participating shards. In FIG. 10C, the client 1005 has distributed each received endorsement 1032 to the participating shards 1010 other than the respective shard that the response 1030 was received from. By way of illustration, the client 1005 has distributed to shard D 1010D the endorsement 1032B and the first 1034B and second 1036B hash puzzle from shard B 1010B and the endorsement 1032C and the first 1034C and second 1036C hash puzzle from shard C 1010C. The information from the responses of the other peers are sent to shard B 1010B and shard C 1010C, respectively.

As illustrated in FIG. 10C, the client 1005 has distributed: the responses 1030B, 1030C to shard D 1010D; responses 1030C, 1030D to shard B 1010B; and responses 1030B, 1030D to shard C 1010C. In other embodiments (not shown), the participating shards may send their endorsement to the other participating shard members. Since transactions are often endorsed only on a subset of the shards' peers, the RWSets are only available on the endorsing peers. In order to preserve confidentiality, the prepare (operation 1120) and decide (operation 1135) transactions do not contain the endorsements themselves.

A transaction in a blockchain framework may mean two things: a) the transaction proposal, which involves a command to the endorsing peer about how to execute a transaction; and b) the transaction itself as it is sent to the orderer which includes most of the information from (a), including the data returned from the endorsing peers in response to (a). This is the transaction that ends up in the ledger. In the present disclosure, the transactions of type (a) are exactly like the original blockchain framework transactions of type (a), however the transactions of type (b) in the present disclosure do not contain (a) as in the original blockchain framework. From the shard perspective, the answer is more difficult: the transaction cannot be committed until it sees (b). However, the client in the present disclosure is doing something additional—it disseminates the H(V), H(N) pairs among all shards to prepare them for how to parse the commit transaction.

FIG. 10D is a block diagram illustrating a fourth state 1000D corresponding to operation 1120. The prepare transaction 1000D begins the atomic commit, which ends with 1000G in FIG. 10G, operation 1140 in FIG. 11. The steps prior to the prepare transaction disseminate the information itself. This is needed so that the non-participating shards see only hashes, whereas the participating shards have the hash pre-images.

In FIG. 10D, the client has created a prepare transaction 1040 containing the information from the received responses 1030 along with the TxID and submitted it to the blockchain. Upon receiving the respective prepare transaction 1040, the participating shards 1010, in operation 1125, commit the prepare transaction 1040. They do so by:

Locking the read-set keys
Recording the write-set for decision time
Checking the validity of the transaction Locking the read-set keys means that if a subsequent transaction will come and have a write-set that writes to the keys in that locked read-set, this transaction will be deemed invalid until the transaction that locked the read-set keys is finalized as either committed or aborted in the decide phase. This is needed because otherwise the process might get into an endless cycle where every pair of transactions is invalid to each other and no transaction is ever committed. The locking of the read set ensures at least one transaction is committed to advance the overall system progress. Recording the write-set for decision time means saving this data in persistent storage, but not applying it to the database at this time. Checking the validity of the transaction is done by applying a normal set of blockchain rules.

When a client submits a transaction to the blockchain, it usually sends it to a node that ensures that it is propagated to all the nodes in the network in the same order relative to other transactions. In permissionless blockchains, such as Bitcoin, this is done by disseminating a block via gossip to all peers, and the total order is ensured from the fact that mining the block involves a procedure that is like a lottery so the chance that two nodes will win this "lottery" at the same time is slim.

In permissioned blockchains, this is done by having all nodes run a consensus algorithm that creates a total order among transactions. In a blockchain framework, there are two types of nodes—orderers and peers—and the latter are the ones that run the consensus algorithm and then replicate the blocks to the former (peers) type of nodes. Therefore, in order to append a transaction in the blockchain framework, one sends the transaction to an ordering node, and not to all the nodes. Regardless of who the transaction was sent to, "submitting to the blockchain" means that the submission is an irrevocable process and is propagated to all nodes in some way. The details of actually appending of the transaction to the blockchain are beyond the scope of this disclosure.

FIG. 10E is a block diagram illustrating a fifth state 1000E corresponding to operation 1130 in which the shards 1010 have each sent their validity answers $V_r^s$ 1050 to the client 1005, i.e., shard B 1010B sends its validity answer $V_r^s$ 1050B to the client 1005, shard C 1010C sends its validity answer $V_r^s$ 1050C to the client 1005, and shard D 1010D sends its validity answer $V_r^s$ 1050D to the client.

FIG. 10F is a block diagram illustrating a sixth state 1000F corresponding to operation 1135 in which the client 1005 has created a decide transaction 1060 and submits it to the blockchain. The decide transaction 1060 is based on the validity answers 1050 received from the participating shards 1010. In operation 1140, the shards 1010 commit the decide transaction 1060 and the transaction becomes a part of the blockchain ledger. If all of the shards 1010, in operation 1130, voted that the transaction is valid, then the recorded write set is applied and the read-set locks are released by the nodes of each shard.

In order to ensure consistency within a shard, the following may be implemented. If a peer did not receive the RWSets that correspond to a decide transaction 1060, it needs to know whether its shard 1010 is participating. A trivial solution in which the peer contacts peers in its shard is not efficient, and exposes the protocol to denial of service attacks where malicious clients deliberately send decide transactions without any pre-images to slow the network throughput. To that end, the shard's symmetric key $K_s$ 1012 may be used. Since the answers of the hash puzzles are hash pre-images of the form: $K_s$ (TxID||x) where x∈{"0", "1"}, the answers are: indistinguishable from random data to anyone but the peers of shard S 1010 (thus not leaking which shard produced the pre-image), and can be decrypted by any peer of shard S 1010 to check if shard S 1010 participated in the transaction.

There are certain client 1005 failures that may occur. For example, the read-set may not be left in a locked state indefinitely. To prevent this, there may be a predefined timeout on transactions and/or all shards 1010 may abort the transaction if, following the prepare transaction, a certain amount of blocks have been accumulated without having a corresponding decide transaction. A transaction is thus not left in a frozen state.

In some embodiments, each participating shard needs to know which other shards are participating shards of the transaction. This may either be inferred: a) in the business logic of the smart contract, so every shard knows this implicitly; or b) via shards signing this information and the client then disseminates this information to the other participating shards.

To ensure the shards know to wait for all answers of validity, in some embodiments, a dependencies list may be attached to the requests sent at the beginning by the clients to the shards. To avoid malicious behavior by the client, each shard expects to get a signed dependencies list from each shard it is dependent on. This information may, in some embodiments, also be transferred by the client. In some embodiments, dependencies may also be known by looking at the business logic of the specific request, and not only by the list given by the client.

According to some embodiments, the client first sends proposals which are answered with returned signed endorsements and signed hashes, the latter being used to distribute across the shards. The signed hashes are distributed across the shards, despite the fact that they appear in the prepare transaction. This is because if the shards do not see each other's signature, they cannot trust the hashes because the client might have faked them. On the other hand, if the client puts the signatures in the prepare transaction, then every other non-participating shard can see who the participating shards are by trying to validate the signature(s) with every shard's public key until it finds a public key of some shard that suits the signature and hash—this removes the desirable property of anonymity. This is why the client disseminates the signed hashes across the different shards.

However, the client might be malicious and not disseminate the signed hashes across the different shards. To prevent the client from misbehaving in this way, the shards must somehow know which shard signatures they need to expect for every given transaction. As previously indicated, this may be inferred from the business logic of the smart contract. By way of example, if the function of the smart contract simply transfers money from Alice to Bob, then clearly shard Alice and shard Bob need to sign this. However, there might be some situations where this is not the case. In such cases, each shard may also put some information indicating that these are the shards its part of the transaction depends on. This signed information can then be sent along with the signed hashes.

Technical Application

The one or more embodiments disclosed herein accordingly provide an improvement to computer technology. For example, an improvement to a digital transaction ledger allows for more, efficient, and effective computer transaction documentation that include greater security.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing a private transaction, the method comprising using a client node comprising a processor circuit that is defined as a client processor for:
dividing a blockchain transaction into a plurality of requests, each of the requests having transaction data and a same transaction identifier;
sending each of the requests to a respective participating shard of a set of participating shards in the blockchain transaction of the blockchain;
receiving, from each participating shard, a response to the request;
sending each of the responses to at least the participating shards except the shard the response was received from;
in an atomic commit operation:
creating a prepare transaction comprising information from the responses and the transaction identifier;
submitting, to the blockchain, the prepare transaction that appends the prepare transaction with commitments but without the signatures; and
receiving validity answers from the participating shards;
wherein each response to the request contains an endorsement with a read-write set (RWSet), and two hash puzzles.

2. The method of claim 1, further comprising, in the atomic commit operation:
creating a decide transaction from the validity answers; and
submitting, to the blockchain, the decide transaction.

3. The method of claim 1, wherein a first hash puzzle of the two hash puzzles corresponds to a valid transaction, and a second hash puzzle of the two hash puzzles corresponds to a non-valid transaction.

4. The method of claim 1, wherein each shard of the blockchain has a secret symmetric key chosen uniformly at random that is known only to peers of the respective shard.

5. The method of claim 1, wherein each non-participating shard to the blockchain transaction of the blockchain knows only the transaction identifier of the blockchain transaction.

6. The method of claim 1, wherein communications for read-write sets (RWSets), endorsement on RWSets, and endorsing node identifiers are provided as out-of-band communications from blockchain transaction communications.

7. A system for processing a private transaction, comprising:
a client node comprising a processor circuit that is defined as a client processor;
a plurality of transaction shards, each associated with a respective shard processor circuit that is defined as a shard processor;
wherein the client processor is configured to:
divide a blockchain transaction into a plurality of requests, each of the requests having transaction data and a same transaction identifier;
send each request to a respective participating shard of a set of participating shards in the blockchain transaction of the blockchain;
receive, from each participating shard, a response to the request;
send each of the responses to at least the participating shards except the shard the response was received from;
in an atomic commit operation:
create a prepare transaction comprising information from the responses and the transaction identifier;
submit, to the blockchain, the prepare transaction that appends the prepare transaction with commitments but without the signatures; and
receive validity answers from the shards;
wherein each response to the request contains an endorsement with a read-write set (RWSet), and two hash puzzles; and
wherein each shard processor is configured to:
receive a request related to a blockchain transaction from a client, the request comprising transaction data and a transaction identifier;
send a response to the request to the client;
receive, from the client, a peer response created by other peer shards participating in a the blockchain transaction; and
commit the prepare transaction.

8. The system of claim 7, wherein the client processor is further configured to, in the atomic commit operation:
creating a decide transaction from the validity answers; and
submitting, to the blockchain, the decide transaction.

9. The system of claim 8, wherein each shard processor is further configured to:
process the transaction; and
commit the transaction to the blockchain network.

10. The system of claim 7, wherein a first hash puzzle of the two hash puzzles corresponds to a valid transaction, and a second hash puzzle of the two hash puzzles corresponds to a non-valid transaction.

11. The system of claim 7, wherein each shard of the blockchain has a secret symmetric key chosen uniformly at random that is known only to peers of the respective shard.

12. The system of claim 7, wherein each non-participating shard to the blockchain transaction of the blockchain knows only the transaction identifier of the blockchain transaction.

13. A computer program product for processing a private transaction, the computer program product comprising a computer readable storage medium having computer-readable program code embodied therewith to:
when executed on a client processor circuit that is defined as a processor:
divide a blockchain transaction into a plurality of requests, each of the requests having transaction data and a same transaction identifier;
send each request to a respective participating shard of a set of participating shards in the blockchain transaction of the blockchain;
receive, from each participating shard, a response to the request;
send each of the responses to at least the participating shards except the shard the response was received from;
in an atomic commit operation:
create a prepare transaction comprising information from the responses and the transaction identifier;
submit, to the blockchain, the prepare transaction that appends the prepare transaction with commitments but without the signatures; and receive validity answers from the shards;
  wherein each response to the request contains an endorsement with a read-write set (RWSet), and two hash puzzles; and
when executed on a shard processor circuit that is defined as a processor:
  receive a request related to a blockchain transaction from a client, the request comprising transaction data and a transaction identifier;
  send a response to the request to the client, wherein each response to the request contains an endorsement with a read-write set (RWSet), and two hash puzzles;
  receive, from the client, a peer response created by other peer shards participating in a the blockchain transaction; and
  in an atomic commit operation:
    commit a prepare transaction comprising information from the responses and the transaction identifier.

14. The computer program product of claim 13, wherein the instructions further cause the processor to:
  receive a decide transaction from the client that is used to determine whether to commit or abort the blockchain transaction.

15. The computer program product of claim 13, wherein the instructions further cause the processor, for the commit of the prepare transaction, to:
  lock read set keys;
  record write set information for decision time; and
  determine a validity of the transaction.

16. The computer program product of claim 13, wherein the instructions further cause the processor to:
  wherein the send of the response comprises creating an endorsement of the RWSet and including this in the response.

17. The computer program product of claim 13, wherein the instructions further cause the processor to:
  use an encryption key to encrypt a first value representing a valid transaction ($V_r^s$) and a second value representing a non-valid transaction ($N_r^s$); and
  format the response to provide an endorsement that is a signature over the transaction identifier and the RWSet, a hash of $V_r^s$, and a hash of $N_r^s$;
  wherein:
  s=shard;
  r=request;
  $V_r^s$ represents the pre-image to a hash (valid) of shard s for request r; and
  $N_r^s$ represents the pre-image to a hash (not valid) of shard s for request r.

18. The computer program product of claim 13, wherein the instructions further cause the processor to:
  abort the blockchain transaction if a predefined abort criteria is met of, after receipt of the prepare transaction, a certain amount of blocks have been accumulated without having a corresponding decide transaction.

* * * * *